United States Patent
Svensson et al.

(10) Patent No.: US 11,046,277 B2
(45) Date of Patent: Jun. 29, 2021

(54) AIRBAG UNIT FOR A MOTOR VEHICLE SAFETY DEVICE

(71) Applicant: AUTOLIV DEVELOPMENT AB, Vårgårda (SE)

(72) Inventors: Carl-Johan Svensson, Vårgårda (SE); Johan Fritzen, Vårgårda (SE); Börje Jacobsson, Brämhult (SE); Martin Östman, Vårgårda (SE); Par Sandinge, Alingsås (SE); Jessica Hammarstöm, Alingsås (SE); Jules Houessou, Gothenburg (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 144 days.

(21) Appl. No.: 16/325,751

(22) PCT Filed: Jul. 21, 2017

(86) PCT No.: PCT/EP2017/068545
§ 371 (c)(1),
(2) Date: Feb. 15, 2019

(87) PCT Pub. No.: WO2018/033343
PCT Pub. Date: Feb. 22, 2018

(65) Prior Publication Data
US 2019/0176742 A1    Jun. 13, 2019

(30) Foreign Application Priority Data

Aug. 16, 2016 (EP) .................................. 16184337
Dec. 6, 2016 (EP) .................................. 16202401

(51) Int. Cl.
*B60R 21/215* (2011.01)
*B60R 21/217* (2011.01)
(Continued)

(52) U.S. Cl.
CPC ........ *B60R 21/215* (2013.01); *B60R 21/2176* (2013.01); *B60R 21/237* (2013.01);
(Continued)

(58) Field of Classification Search
CPC .. B60R 21/215; B60R 21/2176; B60R 21/237
See application file for complete search history.

(56) References Cited

U.S. PATENT DOCUMENTS

| 5,498,030 A | 3/1996 | Hill et al. |
| 6,149,231 A * | 11/2000 | Wustholz .............. B60R 21/207 297/216.12 |

(Continued)

FOREIGN PATENT DOCUMENTS

| DE | 102009017919 A1 | 10/2010 |
| DE | 102010051796 A1 | 5/2012 |

(Continued)

OTHER PUBLICATIONS

International Search Report and Written Opinion issued in PCT/EP2017/068545, dated Sep. 28, 2017; ISA/EP.

(Continued)

*Primary Examiner* — Faye M Fleming
(74) *Attorney, Agent, or Firm* — Stephen T. Olson; Harness, Dickey & Pierce, P.L.C.

(57) ABSTRACT

An airbag unit for a motor vehicle safety device includes an inflatable airbag and a cover. The inflatable airbag is formed of flexible material and provided in a rolled and/or folded package. The cover extends around at least part of the package. The cover includes a first cover portion and a second cover portion. The first cover portion is located on a first side of the package, and at least a region of the second cover portion being located on an opposite second side of the package. The second cover portion is substantially flexible and is connected to or formed integrally with the first cover (Continued)

portion, and the first cover portion has a predetermined stable shape and is relatively rigid in comparison to the second cover portion.

14 Claims, 14 Drawing Sheets

(51) Int. Cl.
  *B60R 21/237* (2006.01)
  *D04H 1/541* (2012.01)
(52) U.S. Cl.
  CPC ...... *D04H 1/541* (2013.01); *B60R 2021/2178* (2013.01); *D10B 2505/124* (2013.01)

(56) References Cited

U.S. PATENT DOCUMENTS

| | | | | |
|---|---|---|---|---|
| 7,195,273 | B2* | 3/2007 | Lewis | B60R 21/2176 |
| | | | | 280/728.2 |
| 8,286,992 | B2* | 10/2012 | Wagner | B60R 21/20 |
| | | | | 280/728.2 |
| 8,388,018 | B2 | 3/2013 | Fechner | |
| 9,205,797 | B2* | 12/2015 | Ostman | B65B 63/04 |
| 10,471,921 | B2* | 11/2019 | Ydren | B60R 21/2176 |
| 10,486,634 | B2* | 11/2019 | Schmid | B60R 21/2176 |
| 2002/0074778 | A1 | 6/2002 | Melia | |
| 2010/0327565 | A1 | 12/2010 | Wagner et al. | |
| 2012/0061947 | A1 | 3/2012 | Fechner | |
| 2015/0021886 | A1 | 1/2015 | Osterfeld | |
| 2015/0108741 | A1 | 4/2015 | Östman et al. | |

FOREIGN PATENT DOCUMENTS

| | | |
|---|---|---|
| DE | 102011106749 A | 1/2013 |
| DE | 102014008973 A | 12/2015 |
| GB | 2391520 A | 2/2004 |
| JP | 2012523977 A | 10/2012 |
| JP | 2015081082 A | 4/2015 |
| JP | 201574295 A | 11/2016 |
| KR | 1020150045889 A | 4/2015 |

OTHER PUBLICATIONS

Extended European Search Report received for the European Patent Application No. 16202401.2, dated May 8, 2017, 6 pages.
Intention to Grant received for the European Patent Application No. 16202401.2, dated Mar. 13, 2019, 8 pages.
Decision to Grant received for the European Patent Application No. 16202401.2, dated Jul. 25, 2019, 2 pages.
Extended European Search Report received for the European Patent Application No. 16184337.0, dated Nov. 25, 2016, 6 pages.
International Preliminary Report on Patentability received for the International Application No. PCT/EP2017/068545, dated Feb. 28, 2019, 8 pages.
Office Action received for the Chinese Patent Application No. 201780044518.7, dated Sep. 27, 2020, 15 pages (6 pages of Original Copy and 9 pages of English Translation).
Decision to Grant received for the Japanese Patent Application No. 2019-502756, dated Nov. 26, 2019, 5 pages (3 pages of Original Copy and 2 pages of English Translation).
Decision to Grant received for the Korean Patent Application No. 10-2019-7002028, dated Sep. 9, 2020, 4 pages (2 pages of Original Copy and 2 pages of English Translation).

* cited by examiner

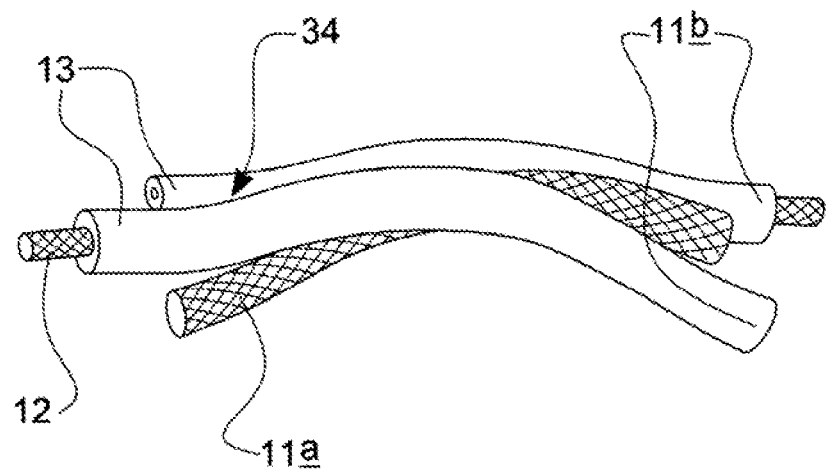
FIG 13
FIG 14
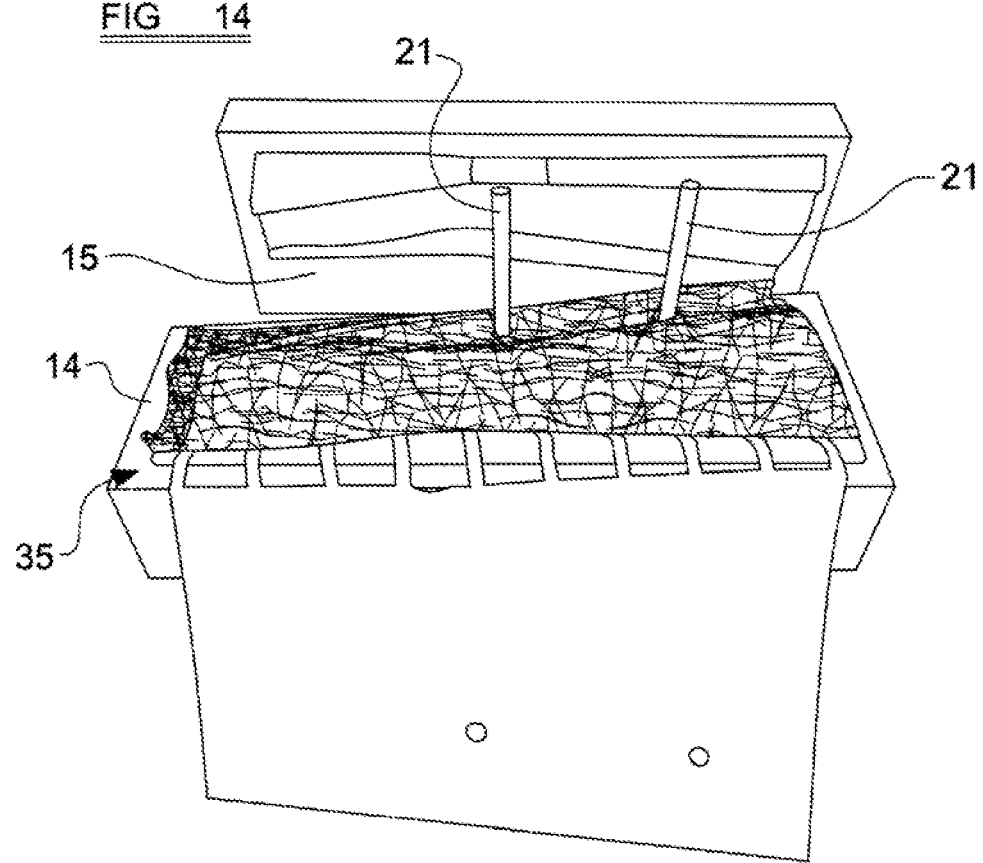

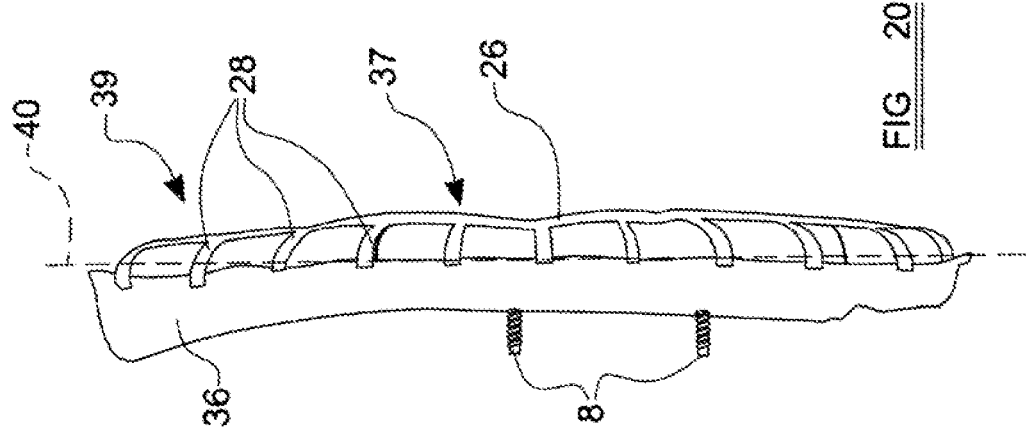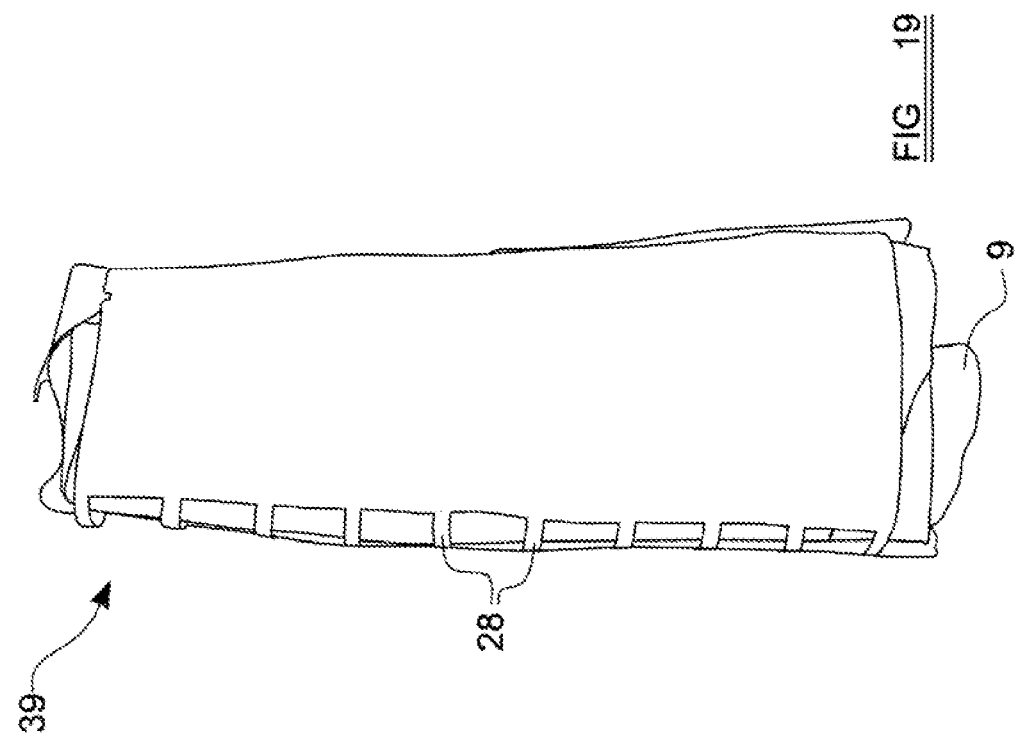

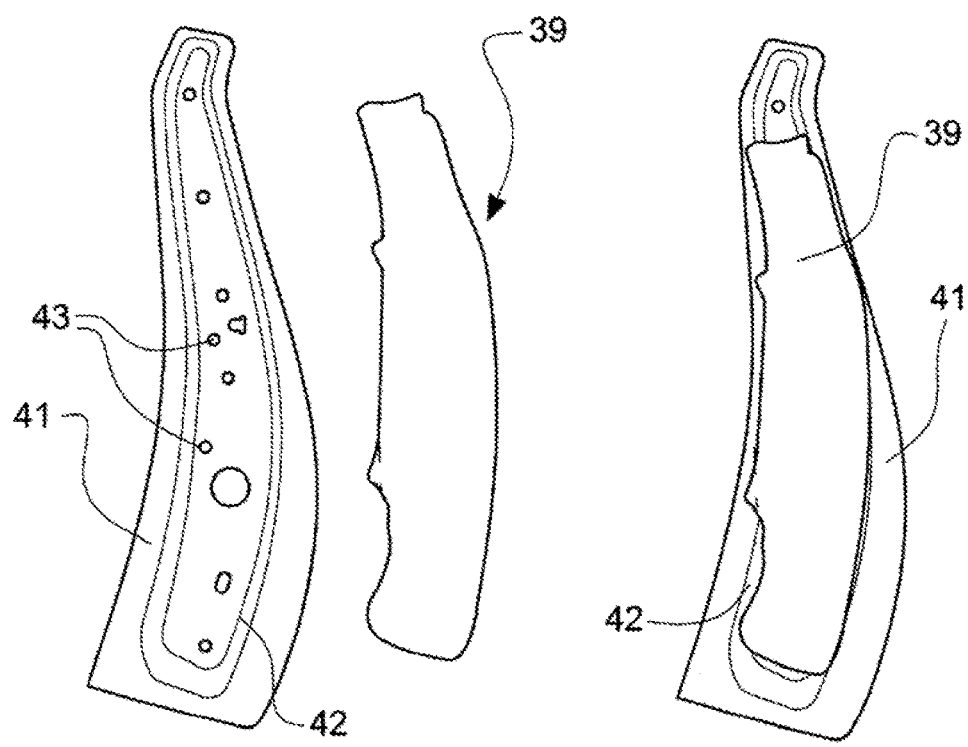

AIRBAG UNIT FOR A MOTOR VEHICLE SAFETY DEVICE

CROSS-REFERENCE TO RELATED APPLICATIONS

This application is a 371 U.S. National Stage of International Application No. PCT/EP2017/068545, filed Jul. 21, 2017, which claims priority to European Patent Application No. 16184337.0, filed Aug. 16, 2016, and European Patent Application No. 16202401.2, filed Dec. 6, 2016. The entire disclosures of the above applications are incorporated herein by reference.

FIELD

The present invention relates to an airbag unit for a motor vehicle safety device.

BACKGROUND

It is now very well known to provide motor vehicles with one or more inflatable airbags to provide protection to the occupants, and also in some arrangements to pedestrians, in the event of an accident involving the motor vehicle. Typically, such airbags are formed from flexible fabric, although some arrangements use other flexible sheet material such as plastics material. Airbags can take various forms such as, for example; so-called driver airbags which typically inflate from within the hub of the motor vehicle's steering wheel to provide protection to the driver of the vehicle in the event of a frontal impact; inflatable curtains arranged to deploy downwardly inside the windows of the motor vehicle to protect occupants in the event of side impacts or rollover accidents; and side airbags arranged to deploy between an occupant of the vehicle and a side panel of the vehicle in order to protect the occupant in the event of a side impact. Of course many other types of airbags are also known, and the present invention is not limited to any particular type of airbag.

Modern motor vehicles are now often designed with very little available space for the mounting of packaged airbags. This can be for a variety of reasons such as aesthetic considerations and for reasons of comfort and convenience to occupants of the vehicle. It is therefore becoming increasingly important to produce very tightly packaged airbags which, in their un-deployed rolled and/or folded configuration, take up very little space within the vehicle, thereby permitting more convenient and imaginative designs of interior trim or seats (for example in the case of side airbags which typically deploy from inside the structure or the upholstery of a vehicle seat).

It is also considered convenient to provide such packaged airbags in the form of pre-formed modules or units which can then easily be installed in the motor vehicle during assembly on the production line. Typically, conventional airbag units of this type comprise a hard plastic cover provided around the airbag in order to retain the airbag in its tightly packaged condition and to facilitate convenient and reliable installation of the unit in a motor vehicle. However, such covers add significantly to the cost and weight of the airbag unit, and also add extra bulk to the packaged airbag which makes it difficult to produce airbag units of sufficiently small size for installation in modern vehicles without compromising the interior design aesthetics of the vehicle.

It has therefore been proposed previously to provide airbag units having somewhat softer outer covers, which nevertheless still impart a predetermined stable shape to the unit. Airbag units of this type can be made to be lighter and smaller (and in particular narrower) than previous conventional proposals having a hard plastic cover. Airbag units of this type have been proposed in which a rolled or folded airbag package is held under compression by a cover which extends around the airbag package and which is formed from ductile fabric material comprising polymeric fibres, at least some of which fibres are fused to one another in order to impart a stable shape to the unit.

SUMMARY

Whilst relatively soft airbag units of the type described above offer significant advantages over conventional hard cover units, they are not without their own inherent problems. For example, it has been proposed to fuse the polymeric fibres of the cover material to one another by the simultaneous application of heat and pressure, for example in a mould. Because the inherent shape can only be imparted to the cover after it has been positioned around the airbag package, this means that the heat and pressure must be applied to the cover material after the airbag itself, and often also its inflator, has been placed inside the cover. This requirement effectively limits the amount of heat energy which can be imparted to the cover during the pressing process in the mould, because the application of too much heat energy can damage the fabric of the airbag itself and/or the inflator inside the cover. The limit which is thus placed on the amount of heat energy which can be imparted to the cover during the heating and pressing process can limit the stability of the shape which is imparted to the airbag unit, due to insufficient fusion of the fibres of the cover material. It has been found that over time, this can result in the cover material relaxing which can cause the airbag unit to expand in places, sometimes in a somewhat random manner, which can affect the installation of such an airbag unit in a motor vehicle. In order to address this problem, it has been found that the addition of a cooling step, after the simultaneous heating/pressing step mentioned above, can help to "fix" the shape of the resulting airbag. However, the addition of a cooling step to the production process adds complexity and cost, which are both disadvantageous.

It is therefore an object of the present invention to provide an improved airbag unit for a motor vehicle safety device.

According to the present invention, there is provided an airbag unit for a motor vehicle safety device, the unit comprising: an inflatable airbag formed of flexible material and provided in a rolled and/or folded package; and a cover extending around at least part of the package; said cover comprising a first cover portion and a second cover portion; the first cover portion being located on a first side of the package, and at least region of the second cover portion being located on an opposite second side of the package; the airbag unit being characterised in that said second cover portion is substantially flexible and is connected to or formed integrally with said first cover portion; and said first cover portion has a predetermined stable shape and is relatively rigid in comparison to said second cover portion.

Conveniently, said predetermined stable shape is 3-dimensional.

Advantageously, said second cover part is a flexible sheet of fabric.

Optionally, said first cover portion is formed from ductile fabric material comprising a plurality of polymeric fibres, at least some of said fibres being fused together to impart said predetermined stable shape to the first cover portion.

Conveniently, said plurality of polymeric fibres includes a plurality of core-sheath bi-component fibres; the sheaths of said bicomponent fibres being fused together to impart said predetermined stable shape to the first cover portion.

Advantageously, said bicomponent fibres each have an inner core of polymeric material having a first melting point, and an outer sheath of polymeric material having a second melting point, the second melting point being lower than the first melting point.

Preferably, said ductile fabric material is a non-woven fabric material.

Advantageously, said plurality of polymeric fibres also includes a plurality of mono-component fibres.

Optionally, said mono-component fibres have a melting point which is higher than the melting point of said sheaths of the bi-component fibres.

Conveniently, each said bi-component fibre has a core formed of PET homopolymer, and the sheath formed of PET copolymer.

Advantageously, said mono-component fibres are formed of PET.

Conveniently, said first cover portion is formed from at least two layers of said ductile fabric material, and fibres from one of said layers are fused to fibres from the other of said layers.

Optionally, said first and second cover portions are both at least partly defined by respective first and second regions of a single sheet of said ductile fabric material, wherein: at least some of said fibres in said first region are fused together to impart said predetermined stable shape and relative rigidity to the first cover portion; and wherein at least a majority of said fibres in said second region are not fused together such that said second cover portion is relatively flexible in comparison to said first cover portion.

Optionally, a connecting region of said second cover portion is connected to said first cover portion and is located on said first side of the airbag package.

Conveniently, said connecting region of said second cover portion is embedded within the first cover portion to thereby interconnect the two cover portions.

Conveniently, said connecting region of the second cover portion defines at least one aperture through which at least some of said fused-together fibres extend.

Optionally, said fabric material of the first cover part is a non-woven fabric material.

Advantageously, said connecting region of the second cover portion is arranged between said at least two layers of the first cover portion and is retained therebetween by fusion of fibres from one of said layers to fibres of the other said layer.

It is envisaged that some embodiments of the present invention may be configured such that said at least two layers of said non-woven fabric material each comprise different specific material to one another.

Conveniently, part of said second cover portion has a predetermined stable shape, said part being relatively rigid in comparison to the rest of said second cover portion.

Optionally, said relatively rigid part of said second cover portion is defined by an area of said second cover portion in which at least some of said fibres are fused together to impart said predetermined stable shape to said part of the second cover portion.

Alternatively, said part of the second cover portion is defined by a relatively rigid element formed from ductile fabric material comprising a plurality of polymeric fibres, at least some of said fibres being fused together to impart said predetermined stable shape to the element.

Advantageously, said plurality of polymeric fibres of said relatively rigid element include a plurality of core-sheath bi-component fibres the sheaths of said bicomponent fibres being fused together to impart said predetermined stable shape to the relatively rigid element of the second cover portion.

Conveniently, said bicomponent fibres of the relatively rigid element each have an inner core of polymeric material having a first melting point, and an outer sheath of polymeric material having a second melting point, the second melting point being lower than the first melting point.

Optionally, said plurality of polymeric fibres of the relatively rigid element also includes a plurality of mono-component fibres.

Advantageously, said mono-component fibres of said relatively rigid element have a melting point which is higher than the melting point of said sheaths of the bi-component fibres.

Conveniently, each said bi-component fibre of said relatively rigid element has a core formed of PET homopolymer, and the sheath formed of PET copolymer.

Optionally, said fabric material of said relatively rigid component is a non-woven fabric material.

Advantageously, said relatively rigid element is formed from at least two layers of said non-woven fabric material, and a region of the second cover part having apertures formed therein is arranged between said at least two layers, wherein fibres from one of said layers are fused to fibres from the other of said layers to interconnect said layers with said region of the second cover part retained therebetween.

It is envisaged that some embodiments of the present invention may be configured such that said at least two layers of said non-woven fabric material from which said rigid element is formed may each comprise different specific material to one another.

Conveniently, wherein said relatively rigid element of said second cover portion is formed from identical material to said first cover portion.

So that the invention may be more readily understood, and so that further features thereof may be appreciated, embodiments of the invention will now be described by way of example with reference to the accompanying drawings in which:

FIG. 13 is a schematic illustration showing some of the fibres of the material fused to one another;

FIG. 14 is a perspective view illustrating the resulting airbag cover, after the press has been opened;

FIG. 19 is a plan view from above of an airbag unit formed in accordance with the present invention;

FIG. 20 is a side elevational view of the airbag unit illustrated in FIG. 19;

FIG. 22 is a plan view showing the airbag unit alongside part of a vehicle seat frame to which the airbag unit may be mounted;

FIG. 23 is a view similar to that of FIG. 22, but which shows the airbag unit mounted to the seat frame;

DETAILED DESCRIPTION

Figure 1:
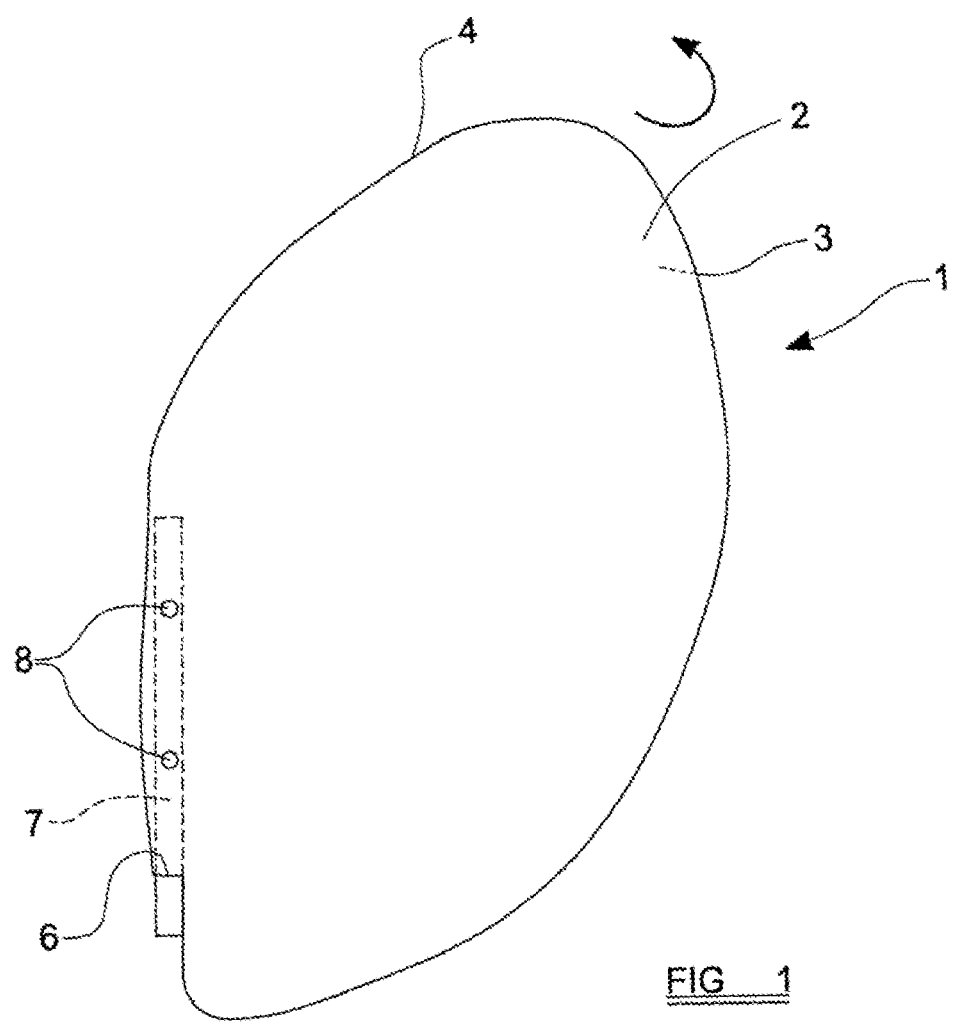
FIG. 1 is a schematic plan view of an unfolded exemplary airbag suitable for packaging as part of an airbag unit in accordance with the present invention.

Turning now to consider the drawings in more detail, FIG. 1 illustrates an airbag 1 suitable for packaging in accordance with the present invention. The particular airbag 1 illustrated is a so-called side airbag of a type intended to be installed in the side of a vehicle seat for deployment between the seat occupant and a side door or panel of the motor vehicle. However, it is to be appreciated that the present invention is not restricted to side airbags of the type illustrated, and indeed could be used to package airbags of any type. Furthermore, it should also be appreciated that the airbag 1 illustrated is shown in a basic form to illustrate clearly the general concept of the invention. Other more complex airbag configurations may also be packaged in accordance with the present invention.

The airbag 1 may be formed from two substantially identical sheets of flexible material 2, 3, such as woven fabric, which are superimposed on one another and interconnected around their aligned edges by a peripheral seam 4 to define a large internal inflatable volume between the sheets for the receipt of inflating gas from an inflator such as a gas generator.

As will be appreciated by those of skill in the art of airbag manufacture, although the airbag 1 has been described above as being formed from two separate sheets 2, 3 of flexible material, it is envisaged that in variants of the invention the airbag 1 could be formed from a single sheet of flexible material, the sheet being folded in half to create two superimposed layers which can then be interconnected by a peripheral seam in an otherwise similar manner to that described above with reference to FIG. 1. It is also envisaged that in some embodiments the two sheets 2, 3 could be woven simultaneously via a so-called "one-piece weaving" technique, known per se, in which the warp and weft yarns forming the two layers are interwoven in selected areas to form an interconnecting peripheral seam which is integral to the woven structure of the two sheets.

The fabric from which the airbag 1 is constructed is preferably a plastic fabric, for example a fabric formed by weaving together warp and weft yarns of polyamide fibres. The fabric may be provided with a coating of thermoplastic material.

The airbag 1 is formed so as to have an opening 6 for insertion of the inflator 7 into the inflatable volume of the airbag. FIG. 1 shows a cylindrical inflator 7 in its installed position in which the inflator extends through the opening 6 such that its major extent lies within the inflatable volume of the airbag. A short length of the inflator 7 projects outwardly from the airbag through the opening 6 to facilitate electrical connection of a control cable. As is conventional, the inflator has a pair of outwardly extending mounting spigots 8 which project outwardly through respective apertures formed in the fabric of one of the sheets 2, and which are configured to be mounted to the structure of a vehicle seat, thereby anchoring the airbag 1 in position against the seat, in a manner known per se.

Figure 2:
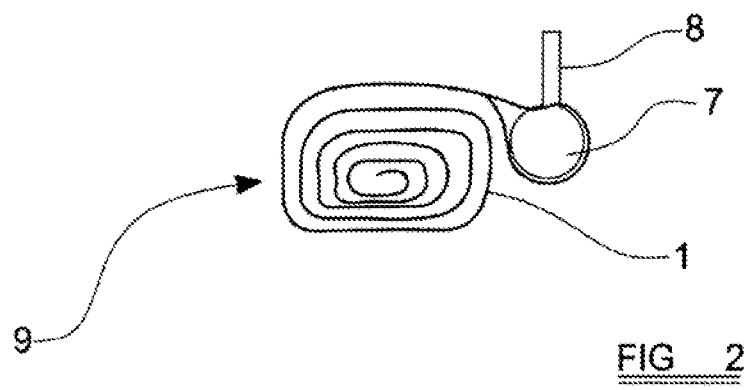
FIG. 2 is a schematic cross-sectional illustration showing the airbag of FIG. 1 in a rolled package.

In order to package the airbag 1 ready for installation in the vehicle, the airbag 1 is initially rolled and/or folded into a small package 9 as illustrated schematically in FIG. 2. The particular package 9 illustrated in FIG. 2 is created by rolling the airbag 1 towards the inflator 7 to create a rolled package 9 comprising a monotonous roll. It is to be noted, however, that the package 9 could alternatively be formed by folding the airbag 1, or by creating two or more rolls in the airbag, or even via a combination of rolling and folding the airbag, each of which techniques are known per se. In the case of a rolling technique, the airbag 1 may be rolled around a mandrel (not shown) which may then be withdrawn from the resulting package 9 along its axis.

As will be appreciated, it is necessary to provide a cover around at least part of the airbag package 9 in order to protect the airbag 1 prior to installation in a motor vehicle, and also once installed in the motor vehicle. Another important function of the cover is to ensure that the rolled and/or folded airbag 1 forming the airbag package 9 does not become distorted or unravelled, because any such distortion or unravelling could adversely affect the manner in which the airbag deploys upon inflation in the event of an accident requiring the airbag to provide protection. Details of the proposed airbag cover, and the manner in which it is provided around the airbag package 9, are described in detail below. However, it is important to note that whilst it is envisaged that most embodiments will have a cover which substantially completely encapsulates the airbag package 9, this is not essential and other embodiments are possible in which the cover may be provided in the form of a simple band formed around the airbag, such that end regions of the airbag package 9 protrude from the sides of the band.

As will be described in more detail hereinbelow, some embodiments the proposed airbag cover of the present invention comprise two main parts, which are formed of different material. It is to be appreciated, however, that other embodiments of the present invention may be configured such that the entire cover is formed from the same type of material, and even from a single sheet of such material. An example of such a cover will be described hereinafter.

Figure 3:
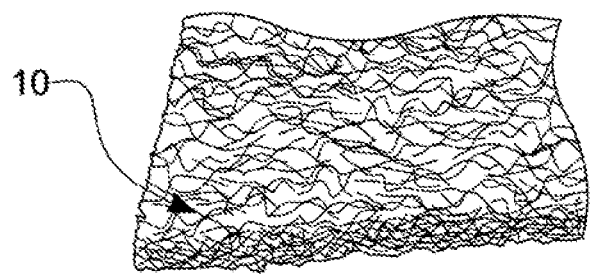
FIG. 3 is a perspective view of material from which a first portion of a cover for the packaged airbag may be formed, the material being shown in its natural condition prior to processing by subsequent steps of the production method disclosed herein.

Considering initially the a cover in accordance with above-mentioned first embodiment, comprising two main parts formed of different material, then it is proposed that a first part of the cover will be formed from a ductile and non-woven fabric material 10, which comprises a plurality of polymeric fibres and may be provided in the form of a layer of felt. FIG. 3 shows a region of the non-woven fabric 10 in its natural condition under atmospheric conditions and prior to subsequent processing steps. In this configuration the material may have a thickness of approximately 4.25 mm and a density of 300 g/m². An exemplary material considered particularly suitable for the present invention is a polyester felt produced by a known needle technique in which a needling process is used to entangle and lock together the constituent polyester fibres of the material. The polyester fibres may be provided in the form of polyethylene terephthalate (PET) such that the felt material 10 is formed of 100% PET.

Figure 4:
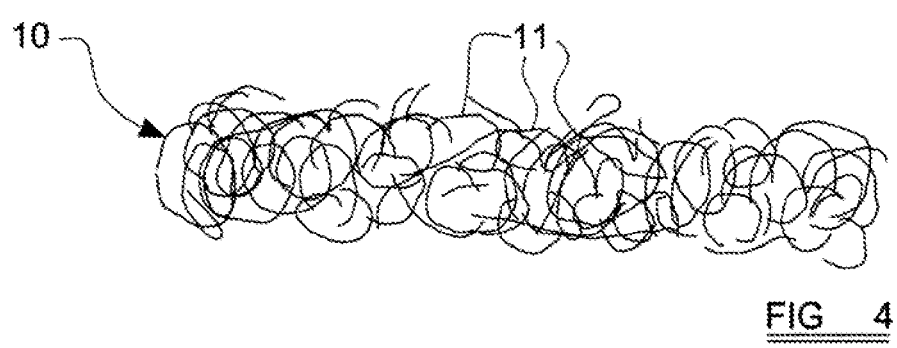
FIG. 4 is a schematic illustration showing the arrangement of fibres in the material shown in FIG. 3.

FIG. 4 is a schematic illustration showing the manner in which the constituent fibres 11 of the felt material 10 are entangled with one another in a random or quasi-random manner. However, it is to be noted that the felt 10 considered most suitable for use in embodiments of the present invention actually includes fibres 11 of two distinct configurations.

Figure 5:
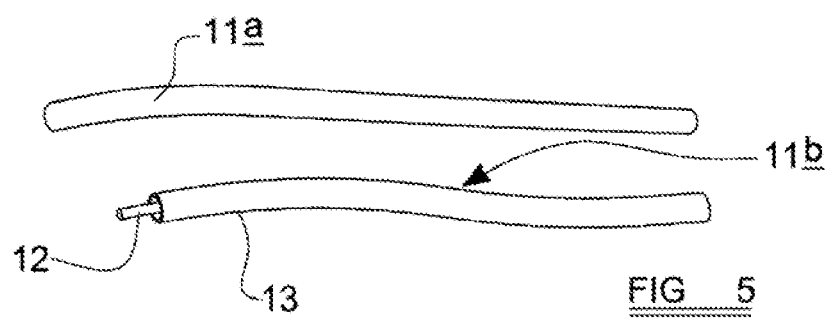
FIG. 5 is a schematic illustration showing two different types of fibres which make up the material shown in FIGS. 3 and 4.

FIG. 5 shows the two configurations of fibre used to make up the felt material 10 in more detail. The upper fibre 11a illustrated in FIG. 5 is a mono-component fibre formed entirely from PET. In particular, it is envisaged that the mono-component fibres 11a will be formed entirely from PET homopolymer. In contrast, the lower fibre 11b illustrated in FIG. 5 is a bi-component fibre having a discrete core 12 and a surrounding sheath 13. The core 12 and the sheath 13 of the bi-component fibre 11b are configured to have different properties, and in particular different melting points, with the sheath 13 having a significantly lower melting point (for example in the range of 120-150° C.) than the core 12. Whilst the bi-component fibres 11b may also be formed entirely from PET, it is proposed that the core 12 will be formed from PET homopolymer, whilst the sheath 13 will be formed from PET copolymer (coPET). This combination of PET and coPET provides the sheath 13 with a lower melting point than the core 12, whilst ensuring that the entire fibre 11b is formed of PET. Of course it will be noted that because the core 12 of the bi-component fibres 11b, and the mono-component fibres 11a are both formed of PET homopolymer, they will have the same melting point as each other; the mono-component fibres 11a thus having a higher melting point than the sheaths 13 of the bi-component fibres 11b

The bi-component fibres 11b are evenly distributed throughout the mono-component fibres 11a within the felt material 10. It is proposed that the bi-component fibres 11b will represent between 30% and 85% of the total number of fibres 11 within the felt material 10, with the balance being made up solely of the mono-component fibres 11a.

Figure 6:
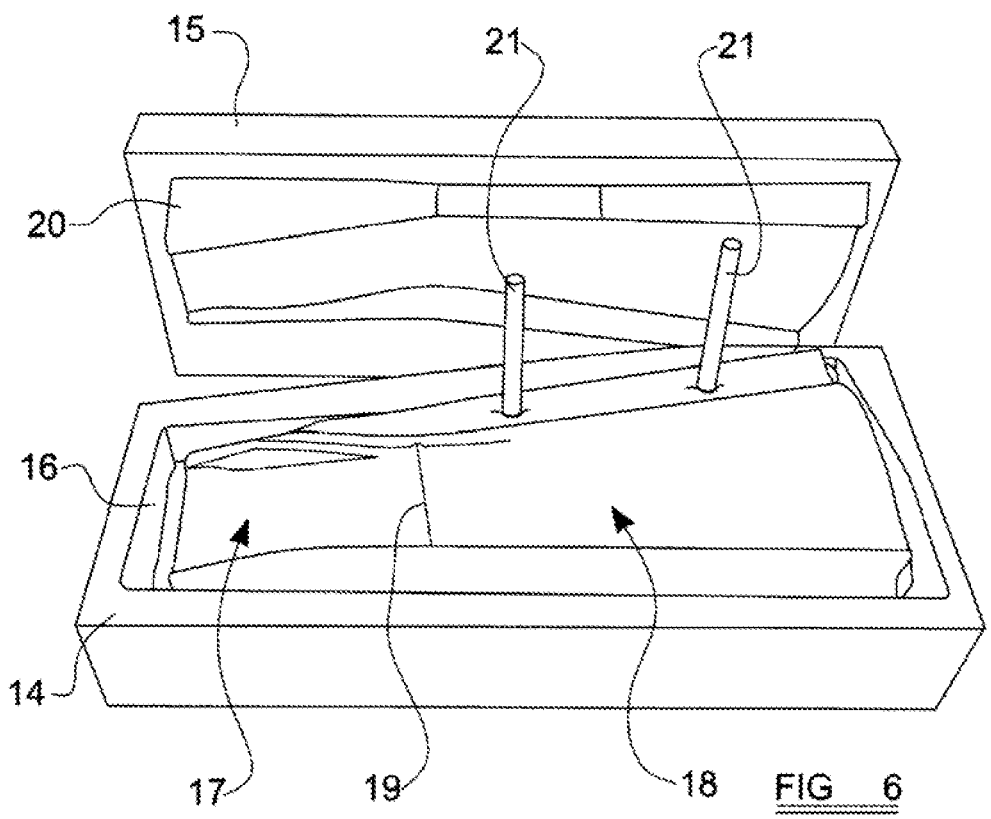
FIG. 6 is a perspective view of a pressing member having a mould cavity which can be used in the method of the present invention.

FIG. 6 illustrates a pair of cooperating mould members member 14, 15 which may each be formed, for example, from cast metal. The lower mould part 14 has a recess defining a mould cavity 16 of three-dimensional form. In the particular arrangement illustrated in FIG. 6, it will be noted that the mould cavity 16 is configured so as to define a first relatively steeply sloped region 17 at one end, and a longer, relatively shallowly sloped region 18 at the opposite end, with the two regions being separated by a ridge 19 which is somewhat higher than the deepest end parts of the two sloped regions. The periphery of the particular mould cavity 16 illustrated in FIG. 1 is also configured so as to narrow from each end towards the ridge 19, such that the ridge 19 is located at a position of smallest width across the mould cavity 17. The upper mould member 15 defines a projecting male mould part 20 of a shape which corresponds generally to that of the (female) mould cavity 16 formed in the lower mould member 14. As will thus be appreciated, the two mould members 14, 15 may thus be brought into engagement with one another such that the mould part 20 of the upper mould member 15 will be received within the correspondingly-shaped mould cavity 16 of the lower mould member 14.

It is also to be noted that the lower mould member 14 is provided with a pair of elongate cylindrical locating posts 21, which extend upwardly from an edge region of the mould cavity 16. The locating posts 21 are of similar diameter to the above-described mounting spigots 8 of the airbag inflator 7, and are also spaced from one another by the same distance by which the mounting spigots 8 of the inflator 7 are spaced from one another. Although not clearly illustrated in FIG. 6, the upper mould member 15 is provided with a corresponding pair of locating apertures therethrough, which are sized and spaced-apart from one another such that each will receive a respective locating post 21 therethrough when the two mould members 14, 15 are brought into engagement with one another.

Figure 7:
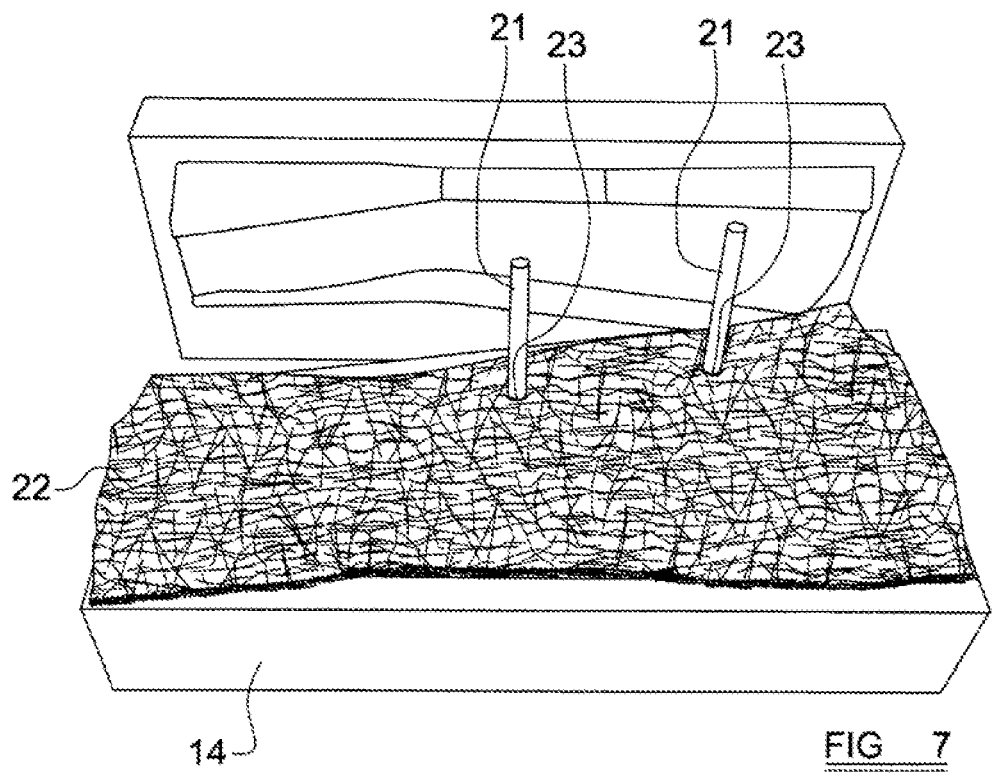
FIG. 7 is a view corresponding generally to that of FIG. 6, but which shows a first layer of material of the type illustrated in FIGS. 3 to 5 laid over the pressing member in order to form a first cover portion.

FIG. 7 illustrates a first layer 22 of the above-described felt material 10 laid loosely over the mould cavity 16 of the lower mould member 14. The layer 22 of felt material has been cut into a shape which at least approximately corresponds to the peripheral shape of the mould cavity 16. As will be noted, a pair of locating apertures 23 have been cut into the layer 22 of felt, with each locating aperture being positioned over a respective locating post 21.

Figure 8:
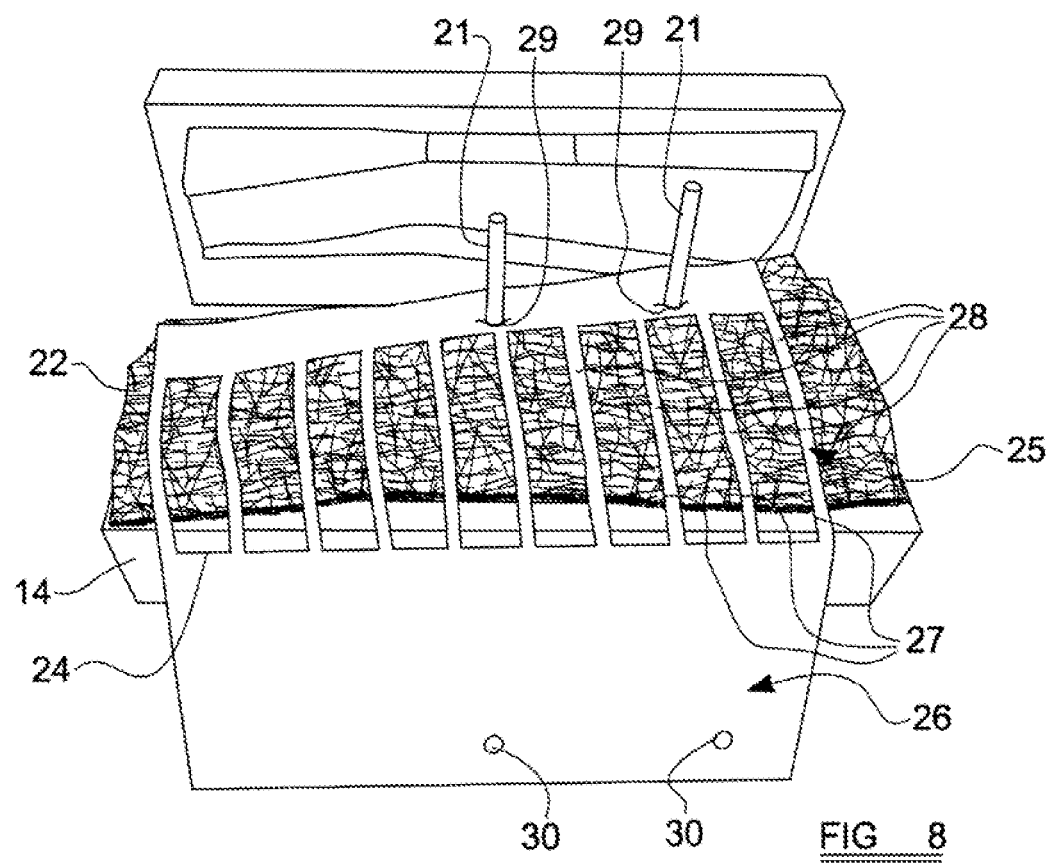
FIG. 8 is a perspective view corresponding generally to that of FIG. 7, but which shows a region of a second cover portion laid over the material illustrated in FIG. 7.

Turning now to consider FIG. 8, a sheet of a second material 24 is shown partially laid over the first layer 22 of felt material 10. The second material 24 is flexible and may be formed as a sheet of woven or non-woven fabric, and in preferred embodiments may be formed from PP90 non-woven fabric of a type known per se. It is envisaged that whatever material is used for the second flexible material 24, it should have good flexibility and good resistance to heat.

As illustrated in FIG. 8, the sheet of flexible material 24 is significantly larger than the first layer 22 of felt material 10 on which it is laid. The sheet of flexible material 24 may be considered to comprise two regions, 25, 26, each of which represents approximately half of the sheet's total area in the particular arrangement illustrated. The first region 25 of the sheet 24 represents a connecting region in the sense that it will serve to connect the sheet of flexible material 24 to the felt material 10 in the finished airbag cover, as will be described in more detail hereinbelow. As will be noted, the connecting region 25 has a skeletonised configuration comprising a plurality of large apertures 27 formed therethrough; the apertures 27 being separated from one another by a series of thin webs 28 of remaining material. The skeletonised connecting region 25 of the sheet 24 also has a first pair of locating apertures 29 which are sized and spaced-apart from one another so as to be positionable over respective locating posts 21, as illustrated. As illustrated in FIG. 8, when the locating apertures 29 of the connecting region 25 are positioned over respective locating posts 21, the apertures 27 and the webs 28 of the connecting region 25 extend beyond the edge of the underlying layer 22 of felt material 10 so as to project therefrom.

The second region 26 of the sheet 24 is substantially continuous in the sense that it is not skeletonised in the same manner as the connecting region 25. The second region 26 does, nevertheless, have a second pair of locating apertures 30 formed therethrough which are sized and spaced-apart from one another so as to be positionable over the mounting spigots 8 of the airbag inflator 7 during a subsequent stage in the production process, as will be described below.

Figure 9:
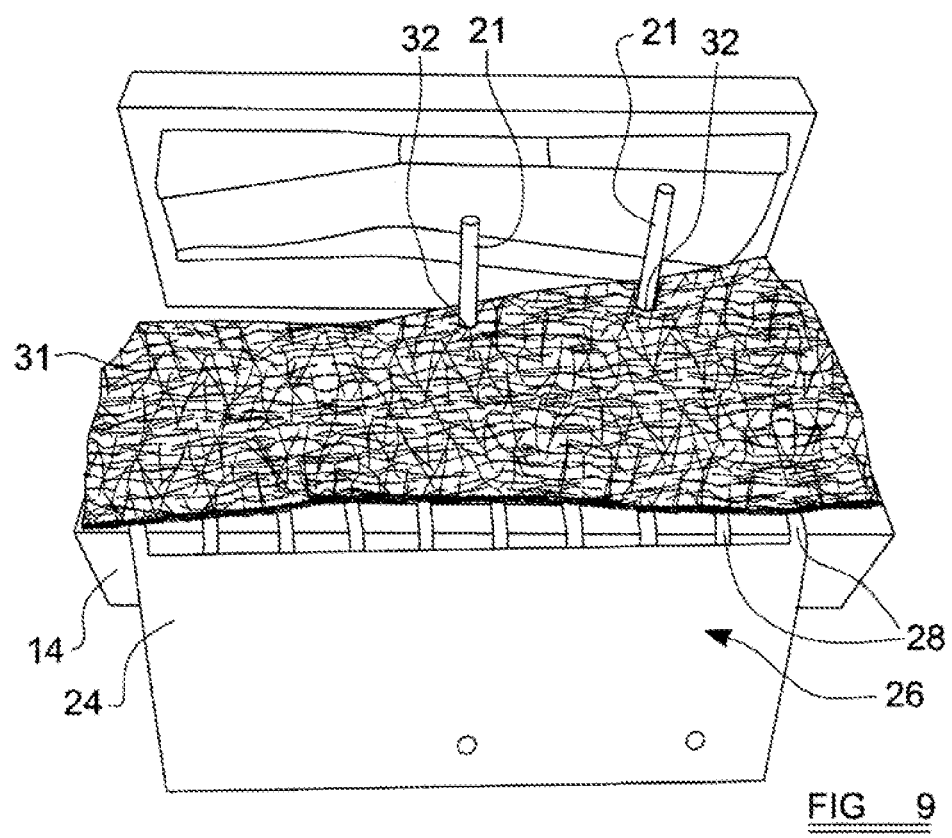
FIG. 9 is a perspective view corresponding generally to that of FIG. 8, but which shows a second layer of material of the type illustrated in FIGS. 3 to 5 laid over part of the second cover portion illustrated in FIG. 8.

Turning now to consider FIG. 9, a second layer 31 of the above-described felt material 10 is shown laid over the connecting region 25 of the sheet 24 of flexible material, such that the connecting region 25 of the sheet 24 is sandwiched between the two layers 22, 31 of felt material 10 in a stack. The second layer 31 of felt material 10 is illustrated as having a shape which corresponds to that of the underlying first layer 22, although this is not essential. As will be noted, another pair of locating apertures 32 are provided through the second layer 31 of felt material 10 for receipt therethrough of respective locating posts 21. As will be noted, the ends of the webs 28 of the connecting region 25 of the flexible sheet 24 project outwardly from between the two layers 22, 31 of felt material 10.

It is to be noted that whilst the invention is herein described with reference to the provision of two layers 22, 31 of felt material 10 in the stack, it envisaged that other embodiments could involve the provision of one or more additional layers of felt material in the stack. Nevertheless it is envisaged that even in embodiments involving the provision of more than two layers of felt material, the connecting region 25 of the flexible sheet 24 will still be provided between two of said layers. It is furthermore envisaged that in some embodiments of the present invention the two layers 22, 31 may not necessarily be formed from exactly the same material as one another. For example, variants are envisaged in which the fibres of one of the layers may be formed from a different polymer than those of the other layer, and/or the fibres of one layer may be more densely concentrated than those of the other layer. It is also possible for the ratio of mono-component fibres to bi-component fibres to differ between the two layers.

Figure 10:
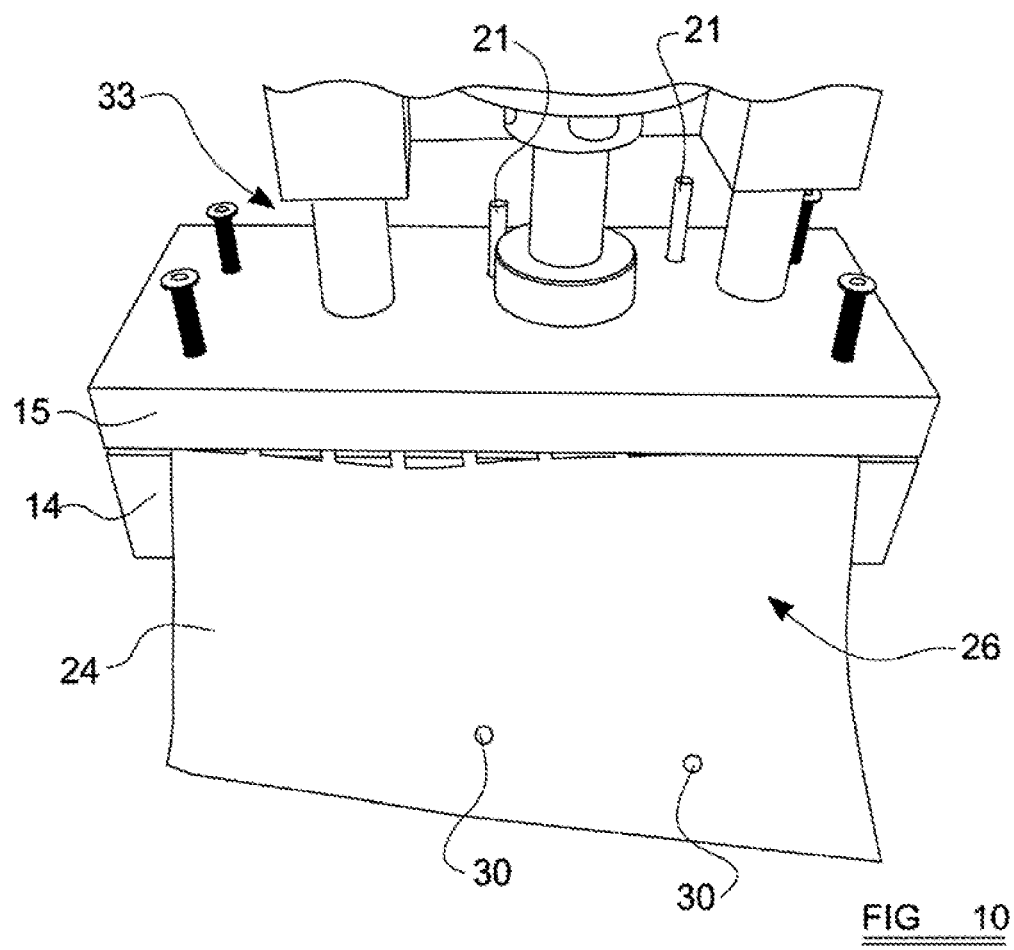
FIG. 10 illustrates a pressing step, in which the layers illustrated in FIG. 9 are compressed together using a press.

FIG. 10 shows the two mould members 14, 15 in engagement with one another such that the mould part 20 of the upper mould member 15 has been inserted into the mould cavity 16 of the lower mould member 14. As will be appreciated, when the two mould members 14, 15 are urged towards one another in this manner, the mould part 20 will serve to squeeze the superimposed layers 22, 31 of felt material 10 and the connecting region 25 of the sheet 24 between the mould part 20 and the mould cavity 16.

FIG. 10 also illustrates a press arrangement 33, which may take the form of a hydraulic press, and which is actuable to urge the two mould members 14, 15 together. It is proposed to actuate the press arrangement 33 to compress superimposed layers 22, 31 of felt material 10 and the connecting region 25 of the sheet 24 between the mould part 20 and the mould cavity 16 whilst the layers and sheet are heated, for example by placing the entire arrangement in an oven, to a temperature in excess of the melting point of the sheaths 13 of the bi-component fibres 11$b$, but which is below the melting point of the cores 12 of the bi-component fibres 11$b$, and also the mono-component fibres 11$a$.

As will be appreciated, the superimposed layers 22, 31 of felt material 10 and the connecting region 25 of the sheet 24 will thus be thus simultaneously heated and pressed, although it is to be noted in this regard that it is not essential for the heat and pressure to be applied at precisely the same instant in time. For example, the heat may be applied before the application of pressure to the superimposed layers and sheet; the important aspect being that there is at least a period of time during which both heat and pressure are applied. The press arrangement may be operated to apply a pressing force of between 5 and 200 kN to the superimposed layers 22, 31 and sheet 24, whilst the temperature is held above the melting point of the sheaths 13 of the bi-component fibres 11$b$. The time period during which the superimposed layers 22, 31 and the connecting region of the sheet 24 are simultaneously heated and pressed will depend on the nature of the felt material 10, but it is envisaged that it will be less than 2 minutes, and of course as short as possible to allow efficient manufacture of the airbag unit.

As will be appreciated, the compression applied to the superimposed layers 22, 31 of felt material 10 and the connecting region 25 of the sheet 24 by the press 33 is effective to conform the stack to the profile of the mould cavity 16 and the undersurface of the mould part 20, on account of the flexible nature of the sheet 24 and the initially flexible nature of the felt material 10. The stack is thus urged into a three-dimensional shape defined by the shape of the mould cavity 16 and the profile of the undersurface of the mould part 20 of the upper mould member 15.

Figure 11:
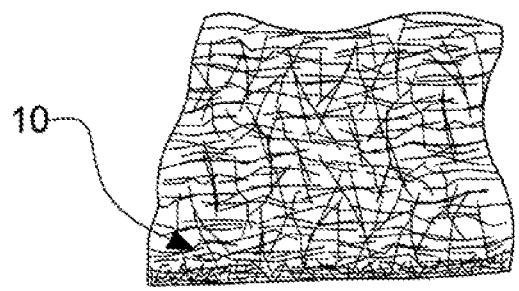
FIG. 11 shows the material of the first cover portion in a condition arising after simultaneous heating and pressing of the intermediate package in the press of FIG. 10.
Figure 12:
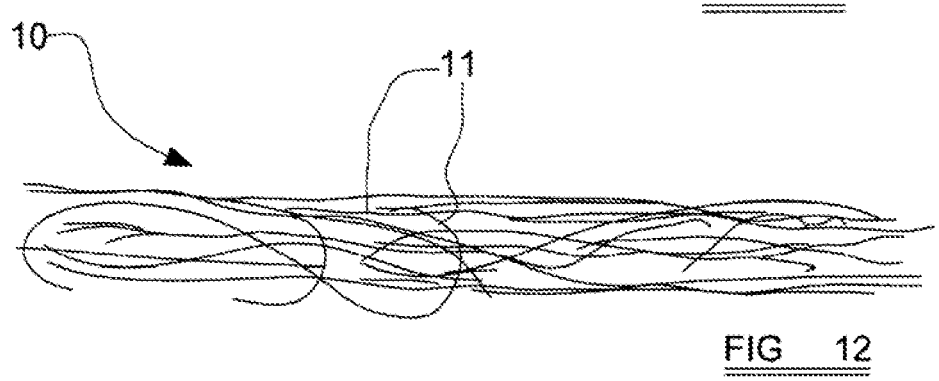
FIG. 12 is a schematic illustration showing the arrangement of fibres in the heated and pressed material shown in FIG. 11.

The simultaneous application of heat and pressure to the stack comprising the two layers 22, 31 of felt material 10 and the connecting region 25 of the flexible sheet 24 will cause the felt material 10 to plastically deform as it is compressed, with the fibres of the two layers 22, 31 being compressed together such that the felt material of each layer 22, 31, becomes thinner and adopts the compressed configuration illustrated schematically in FIGS. 11 and 12. More particularly, the application of heat at a temperature above the melting point of the sheaths 13 of the bi-component fibres 11$b$ will cause the sheaths 13 to melt. At positions throughout the distribution of fibres within the felt material 10, the sheaths 13 will thus fuse together, as indicated schematically at 34 in FIG. 13. However, because the material is heated to a temperature below the melting point of the cores 12 of the bi-component fibres 11$b$, and the entire structure of the mono-component fibres 11$a$, the cores 12 and the mono-component fibres 11$a$ will remain in the solid phase and thus will not fuse together. The result is that only the material of the sheaths 13 fuses. As will also be appreciated, because the two layers 22, 31 of felt material 10 are pressed into intimate contact with one another through the apertures 27 of the connecting region 25 of the flexible sheet 24, the sheaths 12 of the bi-component fibres 11$b$ of the felt material 10 will not only fuse to one another within each individual layer 22, 31 of the felt material 10, but will also fuse together through the apertures 27 of the connecting region 25 of the flexible sheet 24, thus effectively bonding the two layers 22, 31 of felt material to one another as a coherent mass of fibres, and embedding the connecting region 25 (and in particular the webs 28) of the flexible sheet 24 therein. In embodiments which are formed via the inclusion of more than two layers of the felt material 10, then the fibres of some of said layers may be fused together without any flexible material 24 becoming embedded therein.

FIG. 14 shows the resulting airbag cover 35 which is formed from via the above-described heating and pressing technique, following subsequent opening of the press 33 and separation of the two mould members 14, 15. The above-described fusion of the sheaths 13 of the bi-component fibres 11b distributed throughout the felt material 10, both within and between the initial layers 22, 31, is effective and sufficient to retain the pressed three-dimensional shape imparted to the stack by the press 33 when the resulting airbag cover 35 is subsequently removed from the press 33. It is envisaged that the airbag cover 35 may be cooled after it has been removed from the press 33, as this has been found to assist in the long-term retention of the three-dimensional shape imparted to the felt material 10 via the above-described heating and pressing technique.

It is to be appreciated, at this juncture, that the airbag cover 35 is formed via the simultaneous application of heat and pressure, and the subsequent optional cooling step, in the absence of the actual airbag 1 which it is ultimately intended to enclose. This means that the felt material 10 can be heated to sufficiently high temperatures, and pressed under sufficiently high pressures, to ensure effective fusion between the sheaths 13 of its bi-component fibres 11b, and to prevent the resulting three-dimensional shape from relaxing over time, without any risk of damaging either the fabric of the airbag 1 or its inflator 7. The above-described technique also ensures that the pressing members 14, 15 will press directly against the respective layers 22, 31 of the ductile fabric material, which also helps to ensure effective fusion between the sheaths 13 of the bicomponent fibres 11b, and to prevent relaxation in the resulting three-dimensional shape over time.

Figure 15:
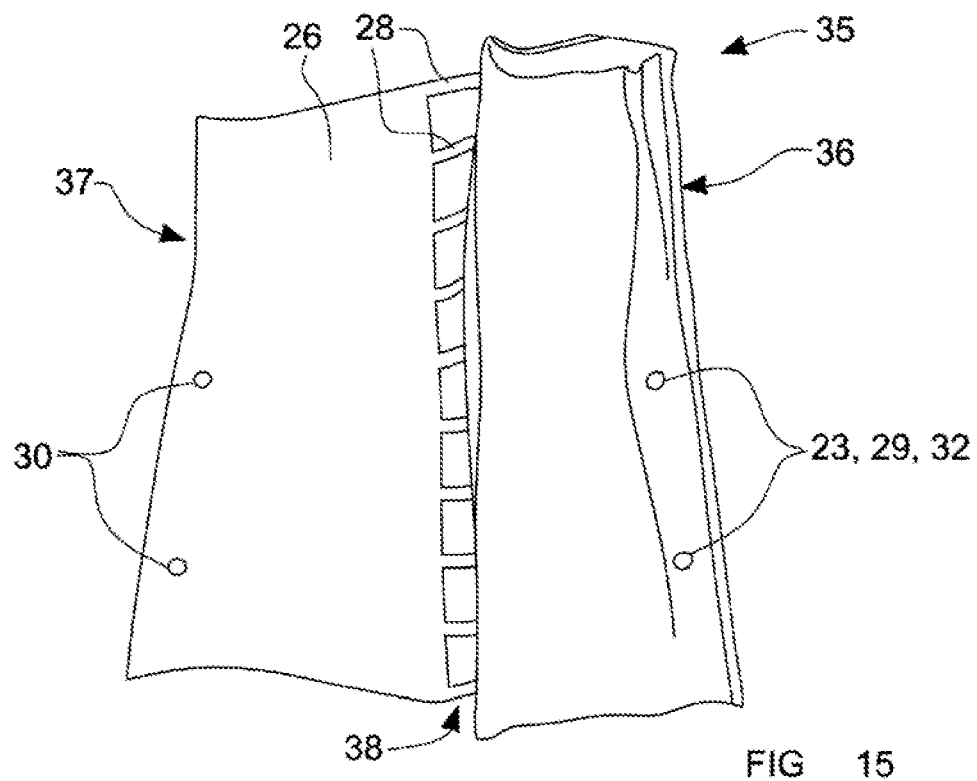
FIG. 15 is a perspective view of the airbag cover after it has been removed from the pressing member.

FIG. 15 illustrates the finished airbag cover 35 after it has been removed from the lower mould member 14 illustrated in FIG. 14. The resulting cover 35 comprises two main portions; namely a first cover portion 36 formed from the fused felt material 10, and a second cover portion 37 formed from the flexible sheet material 24. As will be appreciated, in this embodiment the first and second portions 36, 37 are actually defined by initially separate parts which are interconnected in the manner described above.

In the orientation illustrated in FIG. 15, it can be seen that the first cover portion 36 effectively forms one side (and approximately half) of the cover 35, whilst the second (un-skeletonised) region 26 of the second cover portion 37 effectively forms an opposite side (and approximately half) of the cover 35. As will also be appreciated, due to the above-described fusion of the sheaths 13 of the bi-component fibres 11b in the felt material 10 from which the first cover portion 36 is formed, the first cover portion 36 has a predetermined stable 3-dimensional shape, and is relatively rigid in comparison to the flexible material 24 of the second cover portion 37.

Furthermore, it will be noted that a major area of the connecting region 25 (not visible in FIG. 15) of the second cover portion 37 is embedded within the first cover portion 36, so as to implicated within the fused material of the first cover portion 36. The two cover portions 36, 37 are thus substantially permanently interconnected. As also illustrated in FIG. 15, the exposed ends of the webs 28 of the second cover portion 37 extend outwardly from within the material of the first cover portion 36. These exposed ends of the webs 28 effectively define a hinge 38 about which the second cover portion 37 may be folded around an airbag 1 to enclose the airbag between the two cover portions 36, 37, as will be described in more detail hereinbelow.

Figure 16:
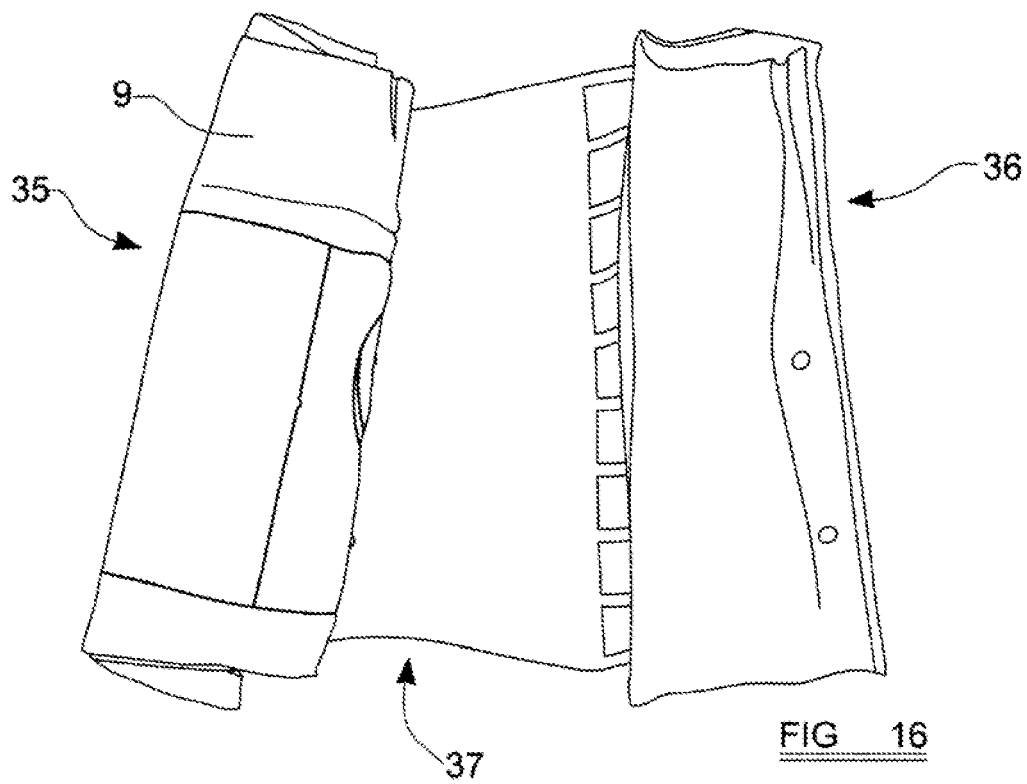
FIG. 16 is a view corresponding generally to that of FIG. 15, but which shows the airbag package of FIG. 2 laid over a region of the second cover portion of the airbag cover.

FIG. 16 illustrates the airbag cover 35, in the same orientation as shown in FIG. 15, but in combination with the airbag package 9 described above and illustrated in FIG. 2. The airbag package 9 is shown positioned over the region of the second cover portion 37 which is remote from the first cover portion 36, and in an orientation such that the mounting spigots 8 of the inflator 7 are extending downwardly, for engagement through respective locating apertures 30 formed in the flexible material 24 of the second cover portion 37 (not visible in FIG. 16).

Figure 17:
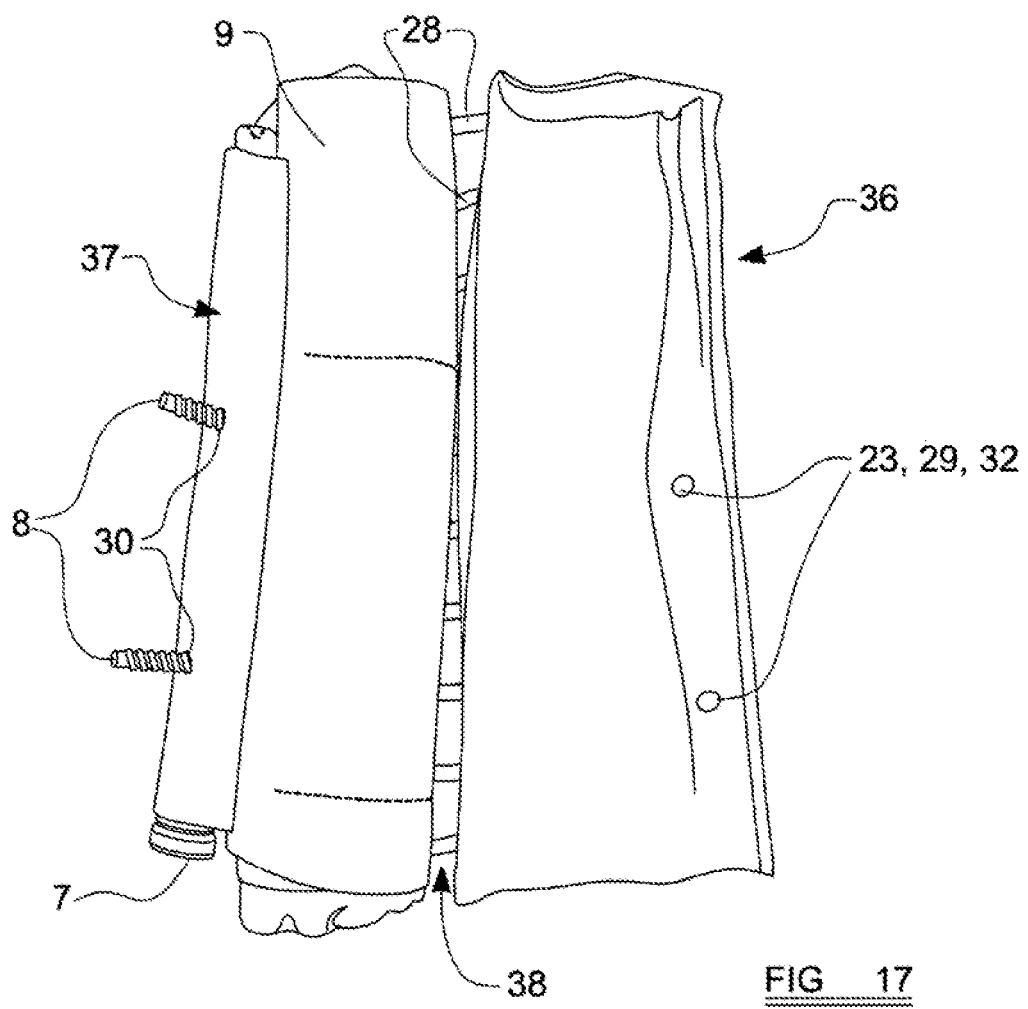
FIG. 17 is a view corresponding generally to that of FIG. 16, but which shows the airbag cover and the airbag package in an alternate condition during closure of the airbag cover around the airbag package.
Figure 18:
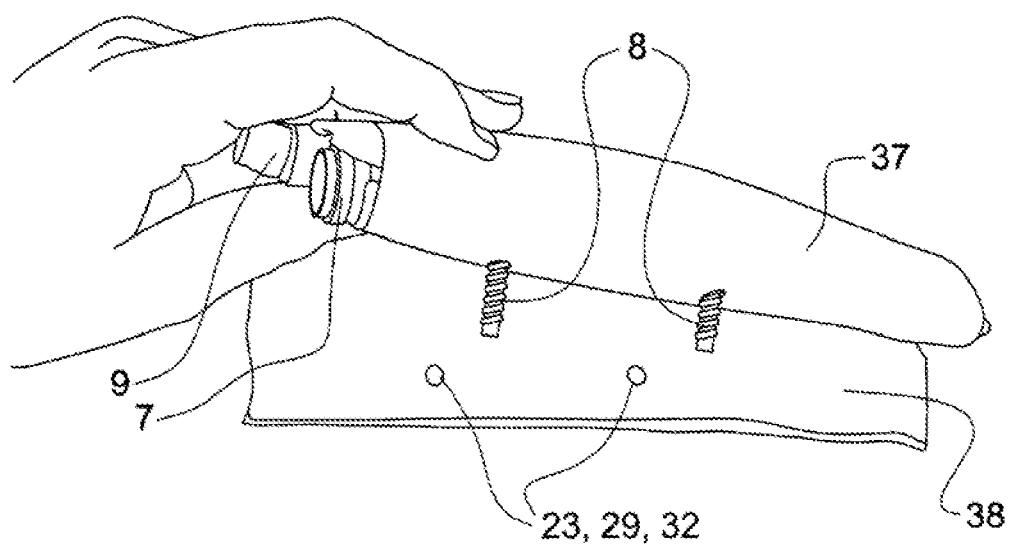
FIG. 18 is a view corresponding generally to that of FIG. 17, but which shows the airbag cover and the airbag package in a subsequent condition during closure of the airbag cover around the airbag package.

FIG. 17 illustrates the airbag package 9 and the airbag cover 35, after an initial closure step, in which the airbag package 9 is rolled towards the first cover portion 36 such that the flexible second cover portion 37 extends around an edge region of the package 9 and extends across one side of the airbag package. FIG. 17 also clearly illustrates the mounting spigots 8 of the inflator extending through the locating apertures 30 formed in the second cover portion 37. From this position, the airbag package 9 is then rolled over on top of itself, towards the first cover portion 36, such that the second cover portion 37, to which the package 9 is now effectively connected, folds about the hinge 38 defined by the exposed ends of the webs 28, as illustrated in FIG. 18. When in this position, the mounting spigots 8 of the inflator 7 may then be offered-up for passage through the aligned locating apertures 23, 29, 32 of the first cover portion 36, as illustrated.

Figure 21:
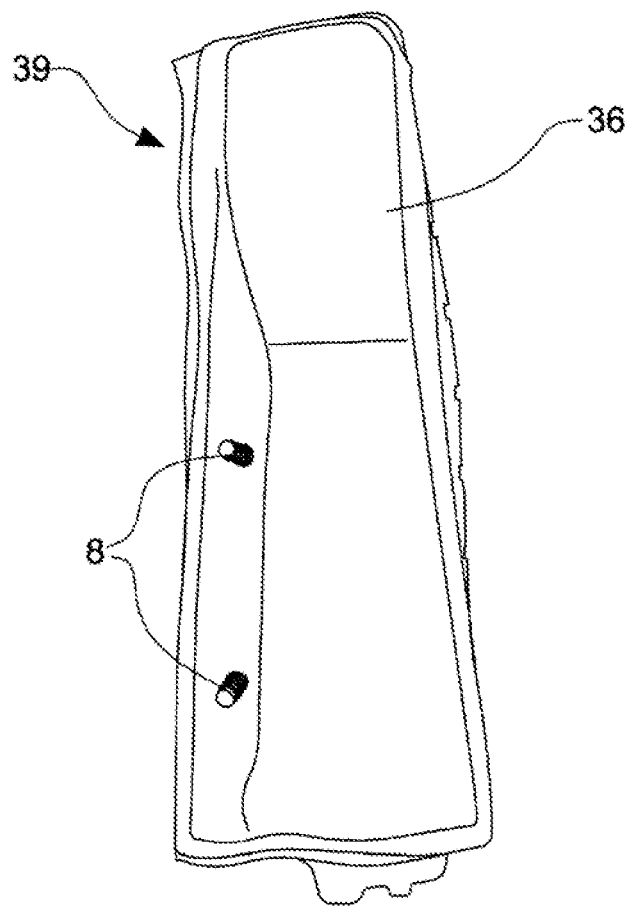
FIG. 21 is a plan view from below of the airbag unit illustrated in FIGS. 19 and 20.

FIGS. 19 to 21 illustrate the complete airbag unit 39 of the present invention, comprising the airbag package 9 and the airbag cover 35 extending around it. The resulting airbag cover 35 is configured such that the first cover portion 36, formed from the fused felt material 10, is located on a first side of the airbag package, with the second (un-skeletonised) region 26 of the second cover portion 37 being located on the opposite side of the package 9. Of course, it will be appreciated that the connecting region 25 of the second cover portion 37, which is embedded within the first cover portion 36, is thus also located on said first side of the airbag package 9, along with the first cover portion 36. The exposed ends of the webs 28, which protrude from within the fused felt material of the first cover portion 36, are located along an edge of the airbag unit 39, such that the airbag package 9 may be visible therebetween. The webs 28 will define relatively weak portions of the airbag cover 35, and due to their adjacent positioning relative to one another may thus collectively define a line 40 of relative mechanical weakness, or a so-called tear-seam, of the cover 35 which will rupture or tear as the airbag 1 is inflated to permit the developing airbag to exit the cover 35.

FIG. 22 shows the exemplary airbag unit 39 alongside a backrest side-frame 41 of a vehicle seat structure. The side frame 41 has a curved recess 42 provided in its outwardly directed surface. The above-described airbag unit 39 can be shaped and sized so as to fit neatly inside the recess 42 in the side-frame 41, with the mounting spigots 8 of the inflator 7 passing through corresponding mounting apertures 43 formed in the seat frame 42. FIG. 23 illustrates the mounted position of the airbag unit 39 against the seat frame 42, and it will be appreciated that the airbag unit 39 may be secured in this position via threaded engagement of respective nuts with the mounting spigots 8. Indeed, it is envisaged that this method of mounting the airbag unit 39 to the seat frame 43, via the mounting spigots 8, will be sufficient to hold the two cover portions 36, 37 of the airbag cover 35 closed around the airbag package 9 therein.

Figure 24:
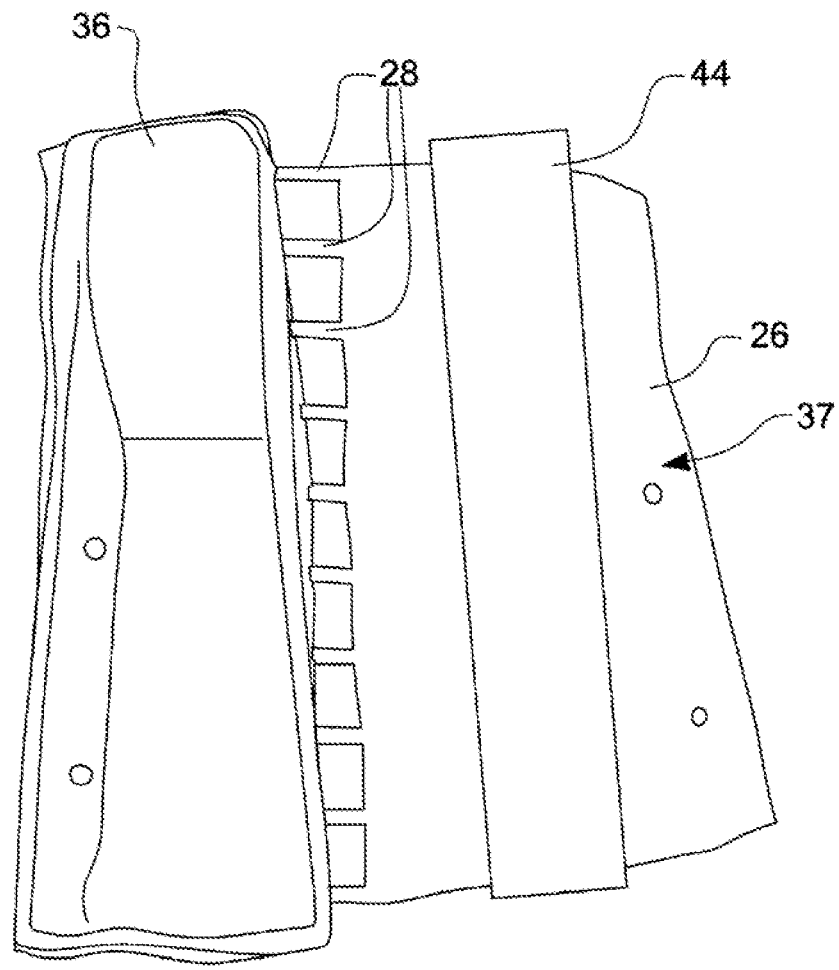
FIG. 24 is a plan view showing an airbag cover of a modified type, suitable for use in another embodiment of the present invention.
Figure 25:
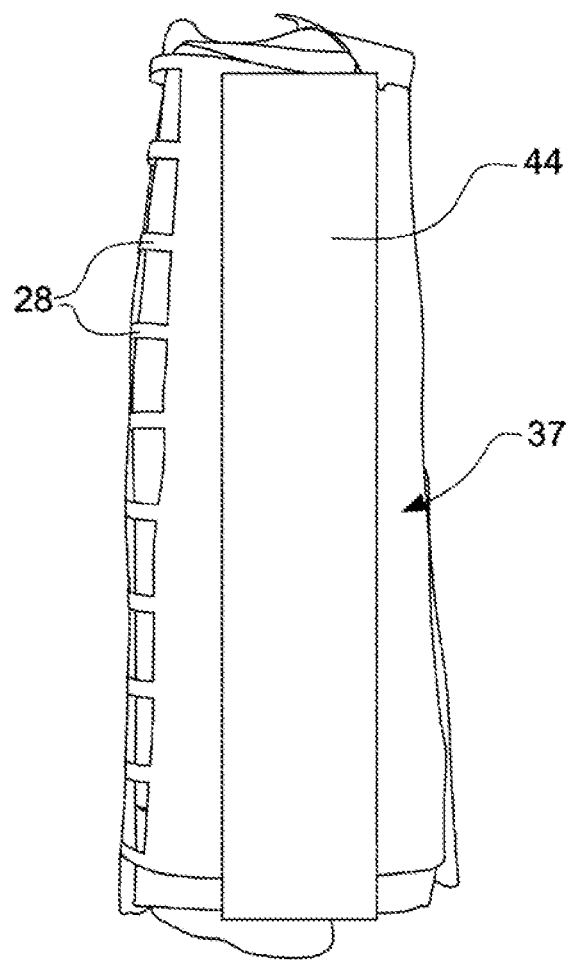
FIG. 25 is a plan view showing the airbag cover of FIG. 24 in a complete airbag unit, thereby covering an airbag package.

FIGS. 24 and 25 illustrate an airbag cover 35 in accordance with another embodiment. Specifically, FIG. 24 illustrates the cover 35 in an open condition, without the airbag package 9, whilst FIG. 25 illustrates the cover 35 closed around an airbag package 9 to define a complete airbag unit 39. The cover illustrated in FIGS. 24 and 25 is substantially identical in all respects to the previously described embodiment, except for the fact that the cover 35 of FIGS. 24 and 25 has an additional element 44 provided as part of the second cover portion 37. The additional element 44 is relatively rigid in comparison to the flexible material 24 from which the rest of the second cover portion 37 is formed, and may be formed from the same or similar ductile fabric, such as the felt 10, as the first cover portion 36. Nevertheless, it is to be noted that in some variants of this embodiment the ductile fabric of the additional element need not necessarily be identical to that from which the rest of the first cover portion 36 is formed.

In more detail, it is proposed to form the additional element 44 in a substantially identical manner as the first cover portion 36. It is therefore proposed to form an area of the second region 26 of the flexible material 24 of the second cover portion 37 with a series of apertures, in a similar manner to that described above in relation to the connecting region 25. The additional element 44 may thus be formed by positioning two layers of the same felt material 10 on respective opposite sides of the apertured area of the second cover portion 37, and then applying heat and pressure to the resulting stack of layers via the same technique proposed above. The two initial layers of felt material 10 will thus become fused through the apertures formed in the flexible material 24 of the second cover portion 37, thereby embedding a region of the second cover portion 37 within the resulting mass of fused felt material defining the additional element 44. It is also envisaged that in some embodiments, the additional element 44 may be formed via the provision of more than just said two layers of felt material, in a similar manner to that described above in connection with the first cover portion 36. Furthermore, variants are also envisaged in which the two layers of ductile fabric used to form the additional element 44 may not necessarily be formed from exactly the same material as one another. For example, variants are envisaged in which the fibres of one of the layers may be formed from a different polymer than those of the other layer, and/or in which the fibres of one layer may be more densely concentrated than those of the other layer. It is also possible for the ratio of mono-component fibres to bi-component fibres to differ between the two layers.

An additional relatively rigid element 44 of the type described above, formed as part of the otherwise flexible second cover portion 37, can be useful in some airbag unit installations because it can add additional rigidity to the airbag unit 39. Whilst the particular configuration of the additional element 44 illustrated in FIGS. 24 and 25 is generally planar in form, it nevertheless has a predetermined stable shape arising from the fusion of fibres within the felt material 10. Furthermore, alternative embodiments are envisaged in which the additional element 44 may be formed so as to have a predetermined stable 3-dimensional shape, in a similar manner to that proposed above with regard to the first cover portion 36.

Turning now to consider FIGS. 26 and 27, an alternative configuration of airbag cover suitable for use in an airbag unit according to the present invention will now be described. The airbag cover which will be described is of the type already briefly mentioned, in which the entire cover is formed from the same type of material. The same reference numbers used above to denote aspects of the invention illustrated in FIGS. 3 to 25 are used again, to denote identical or equivalent aspects of this embodiment.

Figure 26:
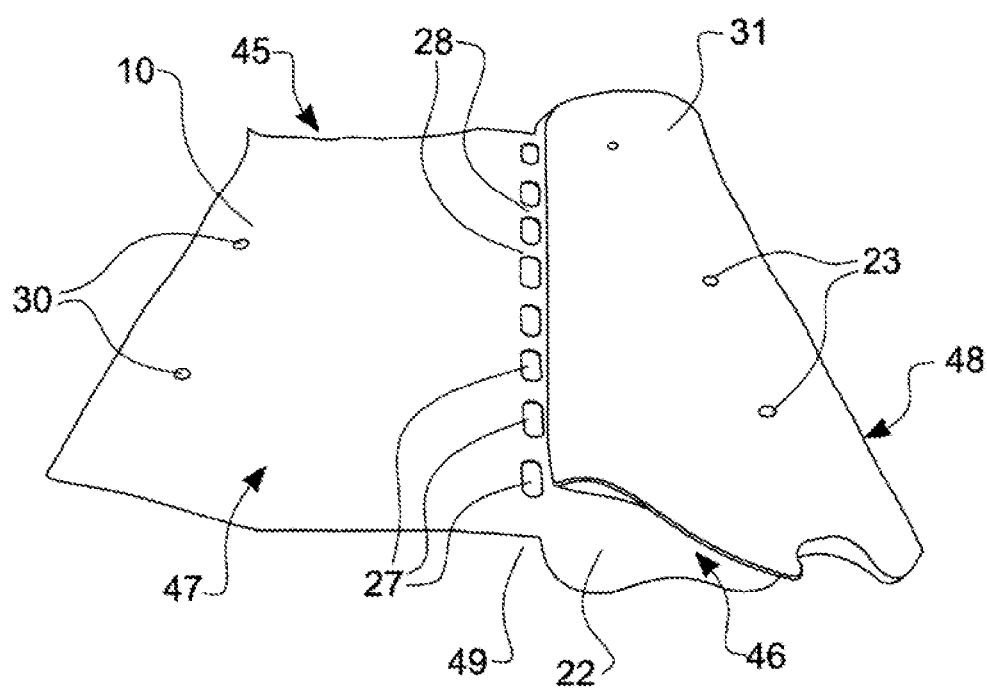
FIG. 26 is a perspective view of a single layer of material of a type similar to that illustrated in FIGS. 3 to 5, from which a cover in accordance with another embodiment may be formed.

FIG. 26 illustrates a single sheet of 45 of ductile and non-woven fabric 10 of the type described in detail above, and which may thus be provided in the form of a sheet of felt. The sheet has a naturally flexible nature prior to the application of heat to fuse its fibres together in the manner described above. The sheet 45 has two regions 46, 47, each of which represents approximately half of the sheet's total area in the particular arrangement illustrated.

The first region 46 of the sheet 10 is actually shown in FIG. 26 in a folded configuration, in which it has been folded in half along a fold line 48 which may define a line of mirror-symmetry of the first region 46. In the folded configuration illustrated, the first region 46 is thus folded into two layers 22, 31 of the felt material 10. The two layers 22, 31 are each provided with locating apertures therethrough, the locating apertures being positioned such that those in the lower layer 22 become aligned with those in the upper layer 31 when the two layers 22, 31 are superimposed, as illustrated, upon folding the first region of the felt material 10.

The second region 47 of the sheet 45 illustrated in FIG. 26 is generally rectangular in form, although it will be appreciated that other shapes are also possible. The second region 47 is also provided with a pair of locating apertures 30 which will serve a similar function as the locating apertures provided through the sheet of flexible material 24 of the previously described embodiment.

As can be seen from FIG. 26, the first and second regions 46, 47 of the sheet 45 are separated from one another by a skeletonized region 49, which is formed by a linear array of somewhat elongate apertures 27 formed through the felt material 10. The apertures 27 are separated from one another by a series of thin webs 28 of remaining felt material 10, the webs 28 thus serving to interconnect the two regions 46, 47 of the sheet 45 across the skeletonised region 49.

Whilst the particular sheet 45 illustrated in FIG. 26 and described above is configured to permit its first region 46 to be folded in half about the fold line 48 to define the two superimposed layers 22, 31, it is envisaged that the two layers 22, 31 could alternatively be provided by respective separate sheets of felt material 10. In such an arrangement, the first region of the sheet 45 may thus be somewhat smaller than the second region 47 so as to define the first layer 22 of felt material, and the second layer 31 may be defined by a separate small sheet of felt material 10 superimposed above the first layer 22. Furthermore, it is even envisaged that the upper layer 31 could be omitted entirely which, as will become apparent, would facilitate the creation of an even thinner airbag package.

In order to form an airbag cover from the sheet 45 of felt material, it is proposed to simultaneously heat and press the superimposed lower and upper layers 22, 31 of the felt sheet 45 in a substantially identical manner to that described above, whilst ensuring that no heat or compression is applied to the second region 47 of the sheet 45. It is therefore proposed to lay the two superimposed layers 22, 31 loosely over the mould cavity 16 described above, as a stack, with the locating posts 21 of the lower mould member 14 received through respective locating apertures 23, whilst arranging the second region 47 of the sheet 45 so that it is substantially clear of the mould cavity 16. Of course, in the case that the upper layer 31 of felt material 10 described above is omitted, then only the single layer defined by the first region of the sheet 45 would be laid across the mould cavity 16 in this manner.

The press arrangement 33 may then be operated in a substantially identical manner to that described above in connection with the proposal of FIGS. 3 to 25. The upper mould member 15 will thus be brought into engagement with the lower mould member 14 and the two mould members will be urged towards one another so as to squeeze the superimposed layers 22, 31 (or single layer) of felt material on one side of the skeletonised region 49. It is to be appreciated that during this process, the second region 47 of the sheet 45 will be kept clear of the press arrangement 33 and its mould members 14, 15. Heat will be applied to the superimposed layers 22, 31 (or single layer) of the first region 46 of the felt sheet 45 whilst the press arrangement 33 is actuated to compress the felt material arranged between the two mould members 14, 15.

The simultaneous application of heat and pressure to the stack comprising the two layers 22, 31 of felt material 10 will cause the felt material 10 in those layers to plastically deform as it is compressed, with the fibres of the two layers 22, 31 being compressed together such that the felt material of each layer 22, 31, becomes thinner and adopts the compressed configuration illustrated schematically in FIGS. 11 and 12. More particularly, the application of heat at a temperature above the melting point of the sheaths 13 of the bi-component fibres 11b will cause the sheaths 13 to melt. At positions throughout the distribution of fibres within the felt material 10, the sheaths 13 will thus fuse together, as indicated schematically at 34 in FIG. 13. However, because the material is heated to a temperature below the melting point of the cores 12 of the bi-component fibres 11b, and the entire structure of the mono-component fibres 11a, the cores 12 and the mono-component fibres 11a will remain in the solid phase and thus will not fuse together. The result is that only the material of the sheaths 13 fuses. As will also be appreciated, because the two layers 22, 31 of felt material 10 are pressed into intimate contact with one another the sheaths 12 of the bi-component fibres 11b of the felt material 10 will not only fuse to one another within each individual layer 22, 31 of the felt material 10, but will also fuse together between the two layers, thus effectively bonding the two layers 22, 31 of felt material to one another as a coherent mass of fibres. In embodiments which are formed by omitting the upper layer 31, as noted hereinbefore, then it will be appreciated that the fibres in the single layer defined by the first region 46 of the sheet 45 will nevertheless fuse to one another to form a (somewhat thinner) coherent mass of fibres.

As will also be appreciated, because the second region 47 of the sheet 45, and indeed also the webs 28 of felt material extending across the skeletonised region 49 of the sheet 45, are not subjected to heat or compression, then the second region 47 and the webs 28 will retain their initial flexibility by virtue of the fact that their constituent fibres will not have been fused together.

Figure 27:
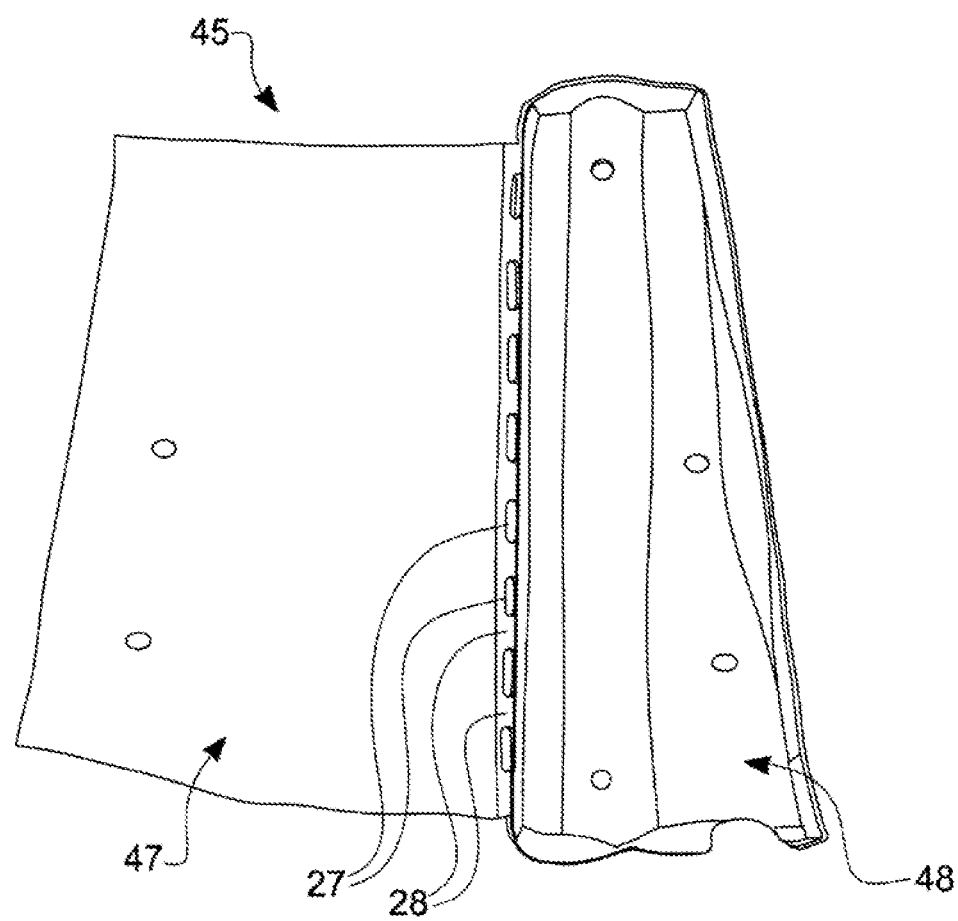
FIG. 27 is a view from above showing a finished cover formed from the single layer of material illustrated in FIG. 26, prior to being closed around an airbag package.

FIG. 27 shows the resulting airbag cover 35 which is formed from via the above-described heating and pressing technique, after it has been removed from the lower mould member 14. The above-described fusion of the sheaths 13 of the bi-component fibres 11b distributed throughout the region 46 of the felt sheet 45 which was compressed between the mould members 14, 15, is effective and sufficient to retain the pressed three-dimensional shape imparted to the stack by the press 33 when the resulting airbag cover 35 is subsequently removed from the press 33. It is envisaged that the airbag cover 35 may be cooled after it has been removed from the press 33, as this has been found to assist in the long-term retention of the three-dimensional shape imparted to the felt material 10 via the above-described heating and pressing technique The resulting cover 35 thus comprises a first cover portion 36 on one side of the line of apertures 27 and webs 28, and a second cover portion on the opposite side of the line of apertures 27 and webs 28. As will be appreciated, the first cover portion 36 thus effectively forms one side of the cover 35 and is defined by the moulded felt material of the first region 46 of the initial sheet 45, whilst the second cover portion 37 effectively forms an opposite side of the cover 35 and is defined by the unmoulded second region 47 of the sheet 45. Furthermore, due to the above-described fusion of the sheaths 13 and the bi-component fibres 11b in the felt material of the first cover portion 36, the first cover portion 36 has a predetermined stable three-dimensional shape, and is relatively rigid in comparison with the still flexible felt material of the second cover portion 37, and indeed also the webs 28.

It is proposed to wrap or close the airbag cover 35 of this embodiment around an airbag package 9 in substantially the same manner as described above with reference to FIGS. 16 to 18 in connection with the previously-described embodiment. In this regard, it will be noted that because the webs 28 of felt material have not been subjected to heat or compression, then they will retain their initial flexibility to permit the cover 35 to be closed around the airbag package 9 as described previously.

As will therefore be appreciated, the embodiment described above with reference to FIGS. 26 and 27 differs from the previously-described embodiment in that it omits the separate sheet of different flexible material 24. In this embodiment, the first and second cover portions 36, 37 are thus defined by respective regions 46, 47 of the same sheet of felt material 10, and are thus formed integrally with one another rather than being initially separate and thereafter connected to one another.

It is to be noted that the embodiment described above with reference to FIGS. 26 and 27 could be further modified by heating and compressing a selected area of the second region 47 of the felt sheet 45, to thereby fuse together the fibres in that area (whilst leaving the fibres throughout the rest of the second region 47 unfused) and thus impart a predetermined stable shape to a particular part of the second cover part 37.

Whilst the present invention has been described above with particular reference to a side airbag, it is to be appreciated that it can be embodied in airbags of other types and configurations. Furthermore, whilst the invention has been described above with specific reference to embodiments using non-woven fabric material 10 of a felt type, variants of the invention are also envisaged that will not use non-woven material. In this regard, it is noted that it is the ductile behaviour of the above-described non-woven felt material 10 that makes it particularly suitable for use in this invention. It is therefore envisaged that other ductile fabric types may also be used in the invention, and which may, for example, be woven. In this regard, the term ductile fabric is used herein to denote a fabric which has a material composition or a construction of its constituent fibres which gives the fibres of the fabric a moveable or elastic behaviour. Such behaviour enables the fabric to conform closely to the form of the mould cavity 16 during the heating and pressing step of the method.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An airbag unit for a motor vehicle safety device, the airbag unit comprising:
    an inflatable airbag formed of a flexible material and provided in a package selected from the group consisting of a rolled package, a folded package and combinations thereof; and
    a cover extending around at least part of the package, the cover including a first cover portion and a second cover portion, the first cover portion located on a first side of the package, and at least a region of the second cover portion located on an opposite second side of the package,
    wherein the second cover portion is substantially flexible and is connected to or formed integrally with the first cover portion, and the first cover portion has a predetermined stable shape and is relatively rigid in comparison to the second cover portion,
    wherein the first cover portion is formed form a ductile fabric material comprising a plurality of polymeric fibers, at least some of the fibers being fused together to impart the predetermined stable shape to the first cover portion.

2. The airbag unit according to claim 1, wherein the plurality of polymeric fibers includes a plurality of core-sheath bi-component fibers, sheaths of the bicomponent fibers fused together to impart the predetermined stable shape to the first cover portion.

3. The airbag unit according to claim 2, wherein the bicomponent fibers each have an inner core of polymeric material having a first melting point, and an outer sheath of polymeric material having a second melting point, the second melting point being lower than the first melting point.

4. The airbag unit according to claim 1, wherein the ductile fabric material is a non-woven fabric material.

5. The airbag unit according to claim 1, wherein the first cover portion is formed from at least two layers of the ductile fabric material, and fibers from one of the layers are fused to fibers from the other of the layers.

6. The airbag unit according to claim 1, wherein the first and second cover portions are both at least partly defined by respective first and second regions of a single sheet of the ductile fabric material, at least some of the fibers in the first region are fused together to impart the predetermined stable shape and relative rigidity to the first cover portion, and wherein at least a majority of the fibers in the second region are not fused together such that the second cover portion is relatively flexible in comparison to the first cover portion.

7. The airbag unit according to claim 1, wherein a connecting region of the second cover portion is connected to the first cover portion and is located on the first side of the airbag package.

8. An airbag unit for a motor vehicle safety device, the unit comprising:
    an inflatable airbag formed of a flexible material and provided in a package selected from the group consisting of a rolled package, a folded package and combinations thereof; and
    a cover extending around at least part of the package, the cover including a first cover portion and a second cover portion, the first cover portion located on a first side of the package, and at least a region of the second cover portion located on an opposite second side of the package,
    wherein the second cover portion is substantially flexible and is connected to or formed integrally with the first cover portion, and the first cover portion has a predetermined stable shape and is relatively rigid in comparison to the second cover portion,
    wherein a connecting region of the second cover portion is connected to the first cover portion and is located on the first side of the airbag package; and
    wherein the connecting region of the second cover portion is embedded within the first cover portion to thereby interconnect the first and second cover portions.

9. The airbag unit according to claim 8, wherein the first cover portion is formed from ductile fabric material comprising a plurality of polymeric fibers, at least some of the fibers being fused together to impart the predetermined stable shape to the first cover portion, and wherein the connecting region of the second cover portion defines at least one aperture through which at least some of the fused-together fibers extend.

10. The airbag unit according to claim 9, wherein the first cover portion is formed from at least two layers of the ductile fabric material and fibers from one of the layers are fused to fibers from the other of the layers, and wherein the connecting region of the second cover portion is arranged between the at least two layers of the first cover portion and retained therebetween by the fusion of fibers from one of the layers to fibers of the other the layer.

11. An airbag unit for a motor vehicle safety device, the unit comprising:
    an inflatable airbag formed of a flexible material and provided in a package selected from the group consisting of a rolled package, a folded package and combinations thereof; and
    a cover extending around at least part of the package, the cover including a first cover portion and a second cover portion, the first cover portion located on a first side of the package, and at least a region of the second cover portion located on an opposite second side of the package,
    wherein the second cover portion is substantially flexible and is connected to or formed integrally with the first cover portion, and the first cover portion has a predetermined stable shape and is relatively rigid in comparison to the second cover portion, wherein part of the second cover portion is a relatively rigid part having a predetermined stable shape, the part being relatively rigid in comparison to a remainder of the second cover portion.

12. The airbag unit according to claim 11, wherein the first cover portion is formed from ductile fabric material comprising a plurality of polymeric fibers, at least some of the fibers being fused together to impart the predetermined stable shape to the first cover portion, wherein the relatively rigid part of the second cover portion is defined by an area of the second cover portion in which at least some of the fibers are fused together to impart the predetermined stable shape to the part of the second cover portion.

13. The airbag unit according to claim 11, wherein a connecting region of the second cover portion is connected to the first cover portion and is located on the first side of the airbag package, and wherein the part of the second cover portion is defined by a relatively rigid element formed from ductile fabric material including a plurality of polymeric fibers, at least some of the fibers being fused together to impart the predetermined stable shape to the element.

14. The airbag unit according to claim 13, wherein the plurality of polymeric fibers of the relatively rigid element include a plurality of core-sheath bi-component fibers the sheaths of the bicomponent fibers being fused together to impart the predetermined stable shape to the relatively rigid element of the second cover portion.

\* \* \* \* \*